(12) United States Patent
Kadambe et al.

(10) Patent No.: US 9,519,049 B1
(45) Date of Patent: Dec. 13, 2016

(54) PROCESSING UNKNOWN RADAR EMITTERS

(71) Applicant: Raytheon Company, Waltham, MA (US)

(72) Inventors: Shubha Kadambe, Thousand Oaks, CA (US); Alexander Niechayev, Riverside, CA (US); Ted Y. Lumanlan, Goleta, CA (US)

(73) Assignee: Raytheon Company, Waltham, MA (US)

( * ) Notice: Subject to any disclaimer, the term of this patent is extended or adjusted under 35 U.S.C. 154(b) by 47 days.

(21) Appl. No.: 14/501,115

(22) Filed: Sep. 30, 2014

(51) Int. Cl.
*G01S 7/02* (2006.01)
*G01S 7/40* (2006.01)
*G01S 7/00* (2006.01)

(52) U.S. Cl.
CPC .............. *G01S 7/021* (2013.01); *G01S 7/02* (2013.01); *G01S 7/022* (2013.01)

(58) Field of Classification Search
CPC .......... G06N 3/02; G06N 3/04; G06N 3/0445; G06N 3/0472; G06N 3/06; G06N 3/063; G06N 3/08; G06N 3/086; G06N 3/12; G06N 3/126; G06N 5/02; G06N 5/022; G06N 5/025; G06N 5/04; G06N 5/046; G06N 5/047; G06N 5/048; G06N 3/0436; G06N 3/0454; G06N 3/049; G01S 7/02; G01S 7/021; G01S 7/022; G01S 7/36; G06K 9/00335; G06K 9/62; G06K 9/6296; G06K 9/6297; G06K 9/64; G06K 9/66
USPC .............. 342/13–20, 175, 192–197, 89–103; 382/100, 103, 155–161
See application file for complete search history.

(56) References Cited

U.S. PATENT DOCUMENTS

| | | | | |
|---|---|---|---|---|
| 5,003,490 A | * | 3/1991 | Castelaz | G06K 9/6281 382/157 |
| 5,287,430 A | * | 2/1994 | Iwamoto | G06K 9/66 706/20 |
| 5,812,083 A | * | 9/1998 | Johnson | G01S 7/021 342/13 |
| 5,884,294 A | * | 3/1999 | Kadar | G06N 3/0436 706/52 |
| 6,591,146 B1 | * | 7/2003 | Pavlovic | G06K 9/6297 382/103 |
| 6,683,968 B1 | * | 1/2004 | Pavlovic | G06K 9/6297 382/103 |

(Continued)

FOREIGN PATENT DOCUMENTS

GB  2245401 A  * 1/1992  .............. G06N 3/049

OTHER PUBLICATIONS

Nikita A. Visnevski; "Syntactic modeling of multi-function radars", McMaster University, 2005, 161 pages.

(Continued)

*Primary Examiner* — Bernarr Gregory
(74) *Attorney, Agent, or Firm* — Daly, Crowley, Mofford & Durkee, LLP

(57) ABSTRACT

Methods and apparatus to receive radar pulses, process the received pulses using weighted finite state machine to learn a model of an unknown emitter generating the received radar pulses, and estimate a state/function of the unknown emitter based on the received radar pulses using the learned model, and predict the next state/function of the unknown emitter based on the received radar pulses and applying maximum likelihood estimation.

18 Claims, 27 Drawing Sheets

(56) References Cited

U.S. PATENT DOCUMENTS

| | | | | |
|---|---|---|---|---|
| 6,694,044 B1 * | 2/2004 | Pavlovic | ............ | G06K 9/00335 |
| | | | | 342/95 |
| 6,788,243 B2 * | 9/2004 | Lavoie | .................... | G01S 7/021 |
| | | | | 342/13 |
| 7,576,682 B1 * | 8/2009 | Yu | ............................ | G01S 7/36 |
| | | | | 342/90 |
| 8,587,468 B2 * | 11/2013 | Card | ....................... | G01S 7/021 |
| | | | | 342/13 |
| 9,063,210 B2 | 6/2015 | Hammack | | |

OTHER PUBLICATIONS

Ienkaran Arasaratnam, Simon Haykin, Thiagalingam Kirubarajan and Fred A. Dilkes; "Tracking the Mode of Operation of Multi-Function Radars", IEEE publication 2006, 6 pages.

Agenda for AOC Conference on Apr. 8, 2014 entitled: Classification and Intent of Unknown and Out of Library Emissions. Authors: Shubha Kadambe, Matthew Markel, James Bowden, Alex Niechayev and Ted Lumanian. 1 page.

Air Land Sea Space Cyber; Classification and Context of Unknown and Out of Library Emissions, Apr. 8, 2014 unclassified presentation at Association of Old Crows. Security clearance required to attend AOC conference. Presentation slides not released to attendees. Note taking at presentation not allowed. 26 pages.

\* cited by examiner

```
        20    22    24    26    28
<State> → <Search> | <ACQ> | <NAT> | <RR> | <TM>
                      ┌─ 30            ┌─ 32
<Search> → <SearchPhrase><Search> | <SearchPhrase><ACQ>

<ACQ> → <AcqPhrase><ACQ> | <AcqPhrase><NAT> | <AcqPhrase><Search>

<NAT> → <NatPhrase><NAT> | <NatPhrase><RR> | NatPhrase><Search>

<RR> → <RRPhrase><RR> | <RRPhrase><TM> | <RRPhrase><Search>

<TM> → <TMPhrase><TM> | <TMPhrase><RR> | <TMPhrase><Search>
                           ┌─ 40              ┌─ 42
<SearchPhrase> → <FourWSearch> | <ThreeWSearch>

<AcqPhrase> → Q1|Q2|Q3|Q4|Q5|Q6

<NatPhrase> → S1T6|Q6

<RRPhrase> → W7T6

<TMPhrase> → <FourWTrack> | <ThreeWTrack>

<FourWSearch> → W1W2W4W5|W2W4W5W1|W4W5W1W2|W5W1W2W4

<ThreeWSearch> → W1W3W5W1|W3W5W1W3|W5W1W3W5

<FourWTrack> → Q6|Q7|Q8|Q9

<ThreeWTrack> → S1T6|S2T7|S2T8|S2T9

S2 → S1|W6   S1 → W1|W2|W3|W4|W5   T6 → W6W6W6   T7 → W7W7W7

T8 → W8W8W8   T9 → W9W9W9   Qi → WiWiWiWi

• Composition of state-to-word FST and Channel Model (word-to-state FST)
• Inversion to yield observation-to-state transducer

PROCESSING UNKNOWN RADAR EMITTERS

BACKGROUND

As is known in the art, radar warning systems can receive signals transmitted by a threat (victim) radar and attempt to identify the emitter. The proliferation of digitally programmable radar and communication hardware has resulted in an increasing number of threat emitters that are not known, e.g., contained in a library of known emitters of an electronic attack system. Typically, a radar warning system characterizes a received signal and looks up in a table to determine an appropriate electronic attack response, for example. If the received signal is from an unknown emitter, potential threats may not be detected and will not be thwarted. This can result in an unsuccessful military mission and/or can harm lives.

SUMMARY

Embodiments of the invention provide methods and apparatus to provide electronic situation awareness with the ability to learn unknown emitters and determine intent of the unknown emitter. In embodiments, a system hierarchically builds threat radar models based on features of observed pulse sequences, which are referred as observations, with the assumption that each radar has its own 'language.' Based on this, tools developed for natural language processing for e.g., automatic speech recognition are used to learn and characterize behavior of unknown threat emitters. Analogous to speech, the radar language comprises pulse sequences, which are analogous to speech phonemes, i.e., units of sound in human speech, waveform sequences—combination of pulse sequences, which are analogous to words in human speech, i.e., combinations of phonemes, and phrases—sequence of words, which are analogous to phrases in human speech, and states, which are analogous to a sentence in human speech.

The tools developed for natural language processing are based on formal language theory, which uses the concept of finite state machines (FSMs) and different operators that can be operated on different types of finite state machines. The types of finite state machines for example, are finite state automaton (FSA) and finite state transducer (FST). Examples of operators that can be operated on these are: union, concatenation, minimize, etc. Starting from a simple finite state machine, highly complex finite state machines can be built hierarchically by applying different operators. An example of this for speech is shown in FIG. 20. A system starting with a finite state machine of pulses and channel, builds (learns) the complex finite state machine of a threat radar hierarchically by applying those operators mentioned above as shown in FIGS. 13-17, for example. The weights—probability of being in a state and state transition probabilities of the finite state machine are learned using the Expectation-Maximization processing, for example. The system estimates the state or radar mode from the observed pulse sequences by using the learned radar threat models. In one embodiment, Viterbi decoding is used for this. The state identification is used in estimating the intent of the emitting radar.

Based on the current estimated state, the next state is predicted, which provides the ability to proactively determine what actions may be taken based on how the threat emitter may respond. For this prediction, in one embodiment, maximum likelihood processing is used. When the features of the observed pulse sequences do not match any of the threat models, the system learns the unknown pulse sequence using the above-described hierarchical approach.

In illustrative embodiments, a reasoning engine can determine emitter intent by unsupervised learning of emitting threat radar behavior. Radar behavior models can be automatically generated using machine learning techniques based on finite state automaton/transducer and computationally efficient formal language operations which are part of the tools developed for natural language processing. Unknown radar behavior or unknown threats can be learned in real time using relatively few observation samples. An integrated de-interleaver, track parsing and reasoning module can determine the intent of multiple threats present at the same time.

In one aspect of the invention, a method comprises: receiving radar pulses; processing the received pulses using weighted finite state automata to learn a model of an unknown emitter generating the received radar pulses; and estimating a state/function of the unknown emitter based on the received radar pulses using the learned model.

The method can further include one or more of the following features: determining weights for the weighted finite state automation using expectation-maximization processing, estimating a mode of the unknown emitter as search or track from the received pulses, predicting a next state for the unknown emitter from a current estimated state of the unknown emitter, interleaving the received pulses based on adaptive stochastic weights, performing parsing, tracking and association of emitters, automatically building finite state machines using FSTs, using tools developed for human speech recognition/text processing to process the received pulses where a radar language comprises pulse sequences, which are analogous to speech phonemes, waveform sequences, which are analogous to words in human speech, and phrases, which are analogous to phrases in human speech, and states, which are analogous to a sentence in human speech, and/or estimating a state/function of the unknown emitter from combinations of the received pulses.

In another aspect of the invention, an article comprises: a non-transitory computer readable medium having stored instructions that enable a machine to: receive radar pulses; process the received pulses using weighted finite state machine to learn a model of an unknown emitter generating the received radar pulses; and estimate a state/function of the unknown emitter based on the received radar pulses using the learned model.

The article can further include one or more of the following features: instructions to determine weights for the weighted finite state machine using expectation-maximization processing, instructions to estimate a mode of the unknown emitter as search or track from the received pulses, instructions to predict a next state for the unknown emitter from a current estimated state of the unknown emitter, instructions to interleave the received pulses based on adaptive stochastic weights, instructions to perform parsing, tracking and association of emitters, instructions to automatically build finite state machines using FSTs, instructions to use tools applied for human speech recognition/text processing to process the received pulses where a radar language comprises pulse sequences, which are analogous to speech phonemes, waveform sequences, which are analogous to words in human speech, and phrases, which are analogous to phrases in human speech, and states, which are analogous to a sentence in human speech, and/or instructions to estimate a state/function of the unknown emitter from combinations of the received pulses.

In a further aspect of the invention, a system comprises: a memory; and a processor coupled to the memory, the processor and the memory configured to: process received radar pulses using weighted finite state machine to learn a model of an unknown emitter generating the received radar pulses; and estimate a state/function of the unknown emitter based on the received radar pulses using the learned model.

The system can further include the processor and memory further configured to include one or more of the following features: determine weights for the weighted finite state machine using expectation-maximization processing, estimate a mode of the unknown emitter as search or track from the received pulses, predict a next state for the unknown emitter from a current estimated state of the unknown emitter, interleave the received pulses based on adaptive stochastic weights, perform parsing, tracking and association of emitters, automatically build finite state machines using FSTs, use tools developed for human speech recognition/text processing to process the received pulses where a radar language comprises pulse sequences, which are analogous to speech phonemes, waveform sequences, which are analogous to words in human speech, and phrases, which are analogous to phrases in human speech, and states, which are analogous to a sentence in human speech, and/or instructions to estimate a state/function of the unknown emitter from combinations of the received pulses.

BRIEF DESCRIPTION OF THE DRAWINGS

The foregoing features of this invention, as well as the invention itself, may be more fully understood from the following description of the drawings in which:

FIG. 2 is a representation of illustrative grammar of the multi-function radar of FIG. 1;

DETAILED DESCRIPTION

Figure 1:
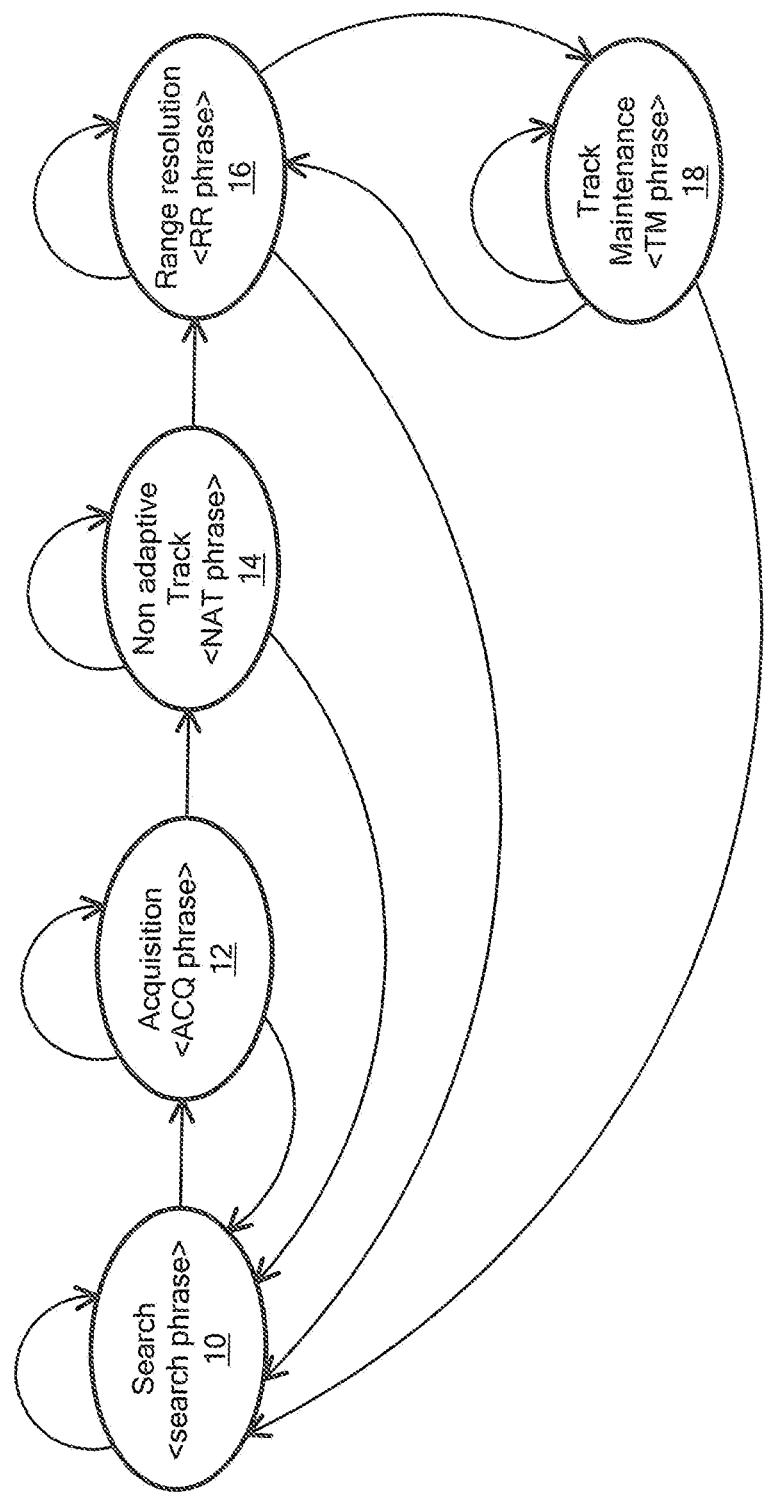
FIG. 1 is a representation of a finite state model of a multi-function radar.

FIG. 1 shows an illustrative finite state machine model for a multi-function radar having a search mode 10, an acquisition mode 12, a non-adaptive track mode 14, a range resolution mode 16, and a track maintenance mode 18. As can be seen, the various states can transition from one to another. Finite state machine (FSM) models for radars can be automatically generated using tools developed for natural language processing, as described more fully below.

As is known in the art, human speech received as acoustic signals can be broken into a hierarchy of phonemes, words, phrases, and sentences, each of which imposes constraints. Hidden Markov Models (HMMs) are used for processing a speech signal since human speech production can be considered as a doubly stochastic process and quasi-stationary or short-time stationary signal. A HMM is a doubly stochastic Markov model in which the system being modeled is assumed to be a Markov process with unobserved (hidden) states. In Markov models the state is directly visible to the observer so that the state transition probabilities are the only parameters to be learned. In a hidden Markov model, the state is not directly visible, but the output that may have produced by a state, is visible. The output, which can be observed, provides information on the possible sequence of states. In the context of embodiments of the invention, the received pulses can be observed and processed to estimate the states of emitters.

FIG. 2 shows illustrative grammar for the multi-function radar of FIG. 1 having states, phrases, words, and pulse sequences. As can be seen, states includes search 20, acquisition (ACQ) 22, non-adaptive track (NAT) 24, range resolution (RR) 26, and track maintenance (TM) 28. The search state 20 includes a phrase 30 for search mode and phrase 32 for acquisition mode. As can be seen, the search state 20 can remain in the search state or transition to the acquisition state 22. Similarly, the ACQ 22, NAT 24, RR 26 and TM 28 states have phrases associated with them and the other states that they can transition to.

From FIGS. 2, 13 and 15, it can be seen that different combination of words (i.e. phrases) are associated with different modes/functions of a radar. For example, a search phrase can include either a 4 or 3 word combinations such as W1, W2, W4, W5 and W1, W3, W5, W1, respectively. Finite state machines associated with these phrases can be built using finite state machine operations as illustrated in FIGs. in 13 and 15. The observable features of pulse sequences correspond to one of the words that a radar uses in its "language." For the radar shown in FIG. 1, it corresponds to w1, w2, w3, w4, w5, w6, w7, w8, w9. These are the building blocks that are used in learning the complex radar finite state machine hierarchically.

Figure 3:
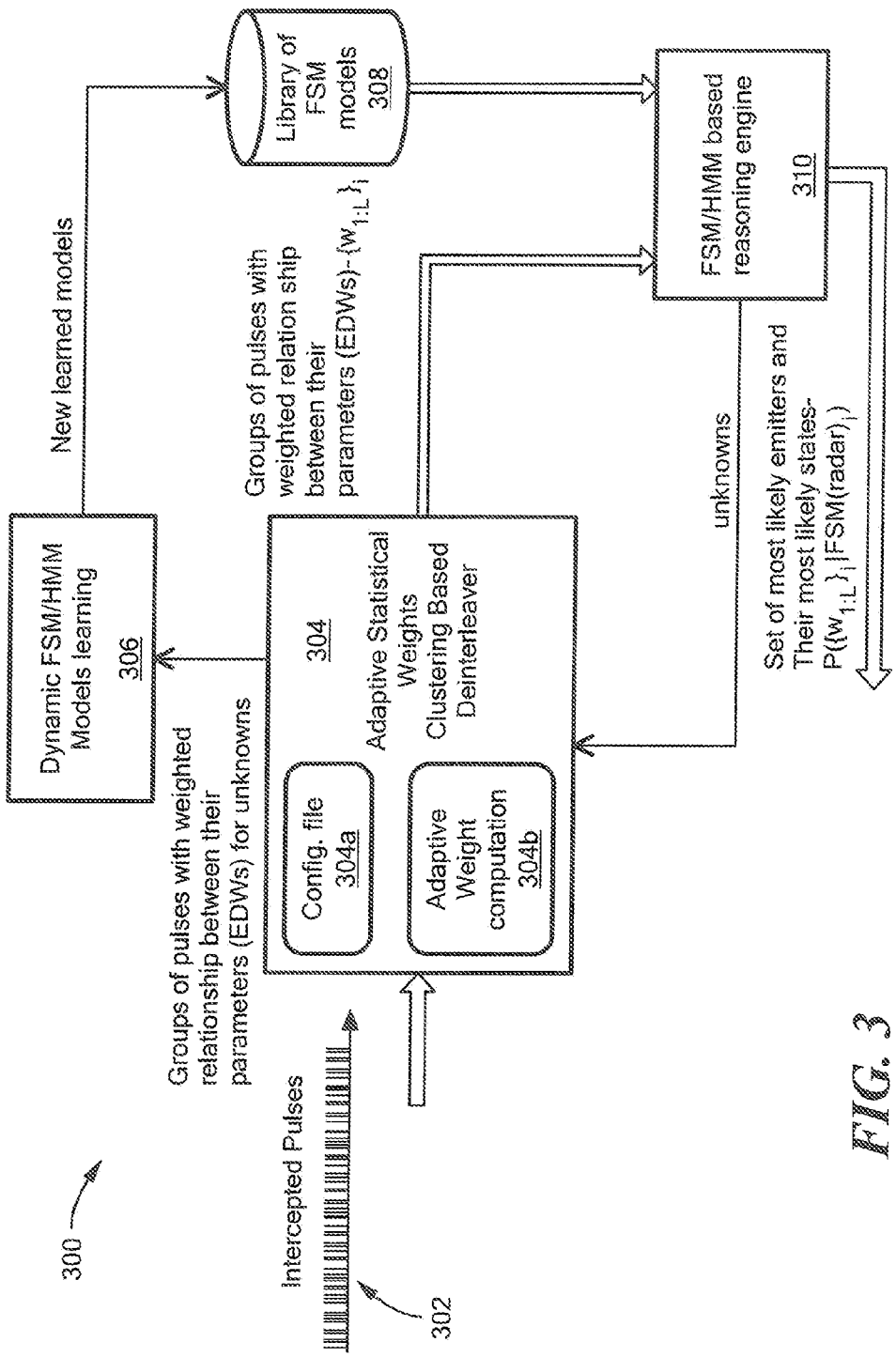
FIG. 3 is a schematic representation of a cognitive electronic situational awareness system.
Figure 4:
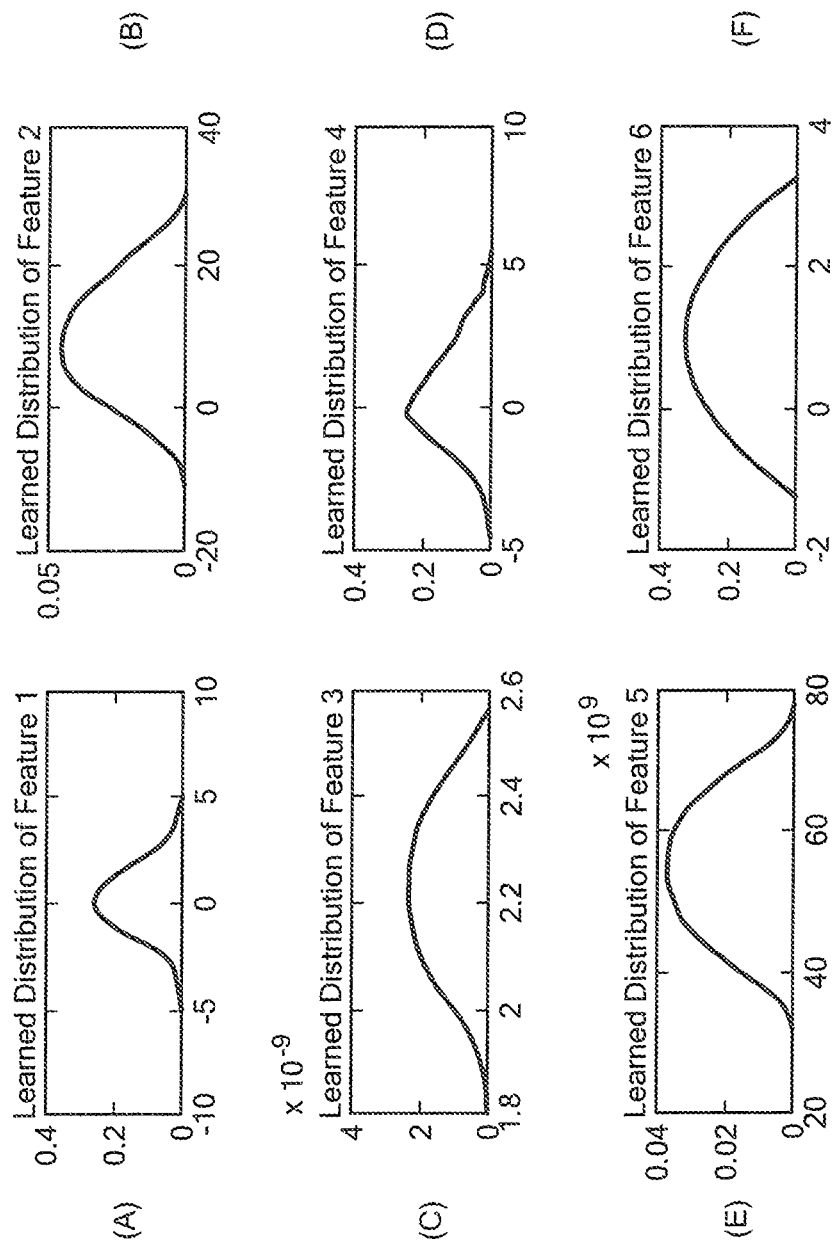
FIG. 4 is a graphical representation of illustrative learned distributions of observations from different threats.

FIG. 3 shows an illustrative cognitive electronic situation (ES) system 300. A series of intercepted pulses 302 are received and processed by an interleaver module 304. Illustrative pulse parameters include dwell length, frequency, pulse width, angle of arrival, pulse repetition interval, scan rate, received energy, etc. In one embodiment, an adaptive statistical weights clustering interleaver module includes a configuration module 304a and an adaptive weight processing module 304b. The output of the interleaver 304 includes groups of pulses with a weighted relationship between parameters. Clustering of received pulses is well known in the art. A novel technique is used herein which learns the adaptive weights or the distribution function from the data to cluster received pulses.

The system 300 includes a model learning module 306 that receives an output from the interleaver module 304. In one embodiment, finite state machine (FSM) and Hidden Markov Mode (HMM) processing is used to generate new models for unknown emitters. The new models can be stored in a model library 308 for later use. A reasoning module 310 receives inputs from the library 308 and the interleaver module 304 and outputs a set of most likely emitters and most likely states, as described more fully below. The reasoning module 310 also provides unknowns to the interleaver 304.

In one embodiment, a kernel distribution provides a nonparametric and data dependent representation of the probability density function (pdf). Kernel distribution is used when a parametric distribution cannot properly describe the data. This distribution is defined by a smoothing function and a bandwidth, which controls the smoothness of the resulting density curve. The kernel density estimator can be defined as:

$$f\hat{}(x) = \frac{1}{nh}\sum_{i=1}^{n} K\left(\frac{x-x_i}{h}\right)$$

where n is the sample size, K is the kernel smoothing function, h is the bandwidth. The smoothing function defines the shape of the curve used to generate the pdf. A Bayesian decision can be made by computing a posterior probability as:

$$p(h|x) = \frac{p(x|h)p(h)}{p(x)}$$

where h is a cluster id, x is the new test data. p(x) can be approximated as:

$$p(x) = \sum_{i=1}^{N} p(x|h_i)p(h_i)$$

A cluster ID can be assigned with the highest posterior probability p(h|x).

An illustrative embodiment was simulated with six threat emitters with feature vectors for the pulses that include {PRI, ERP, Frequency, PW, AOA, IMOP}. In the simulation, these features were varied randomly. Fifty sample points were considered to learn the Kernel based distribution function. Performance was tested using twenty-five new set of sample points.

Figure 5:
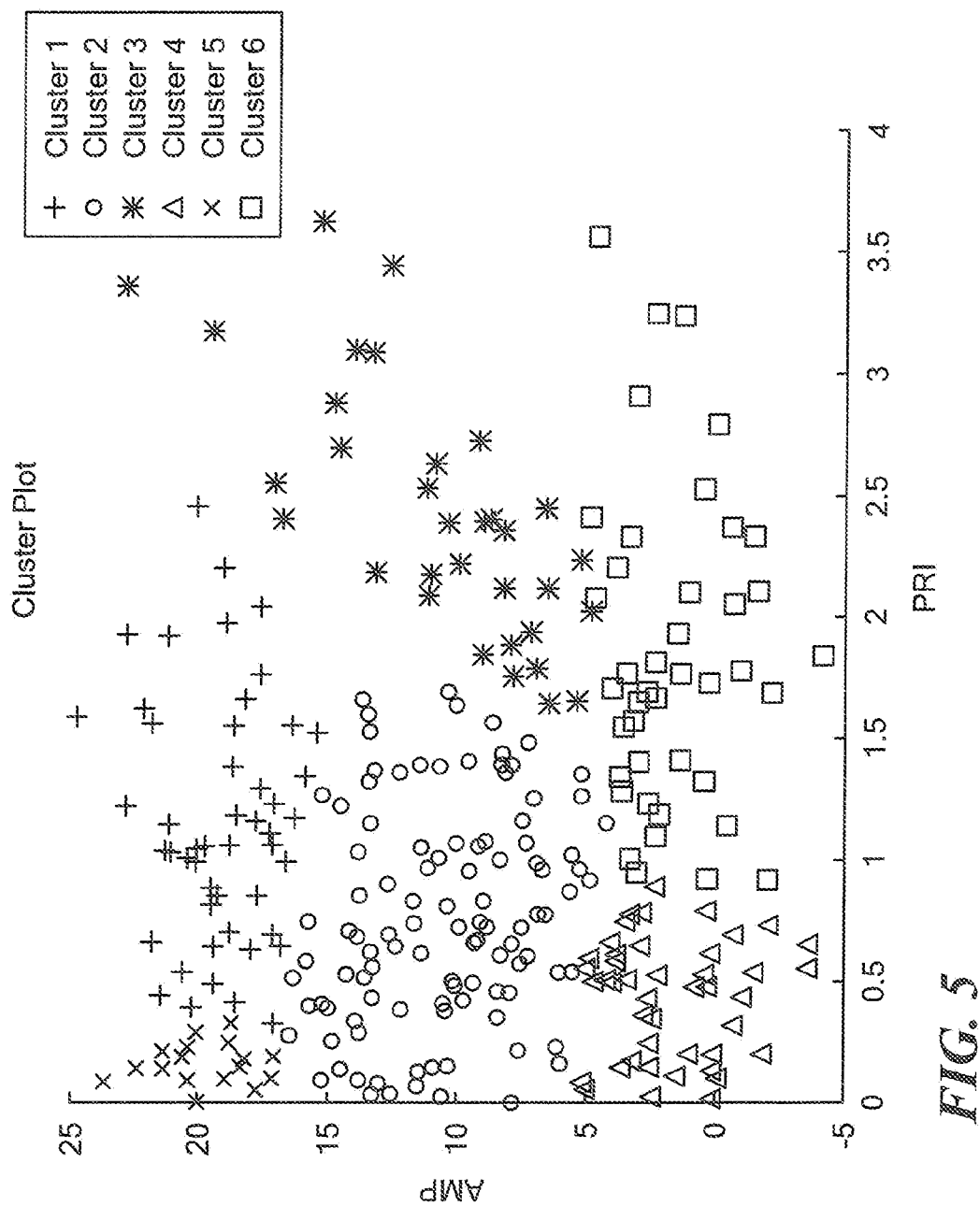
FIG. 5 is a cluster plot of first and second parameters of the observations from six threats.

FIGS. 4A-F show example learned distributions for each of the six features {PRI, ERP, Frequency, PW, AOA, IMOP} for a first threat. FIG. 5 shows a cluster plot for an amplitude feature versus a PRI feature. As can be seen, clusters 1-6 are found illustrating processing is able to group the features associated with different emitters. These clusters are then used to track and separate multiple emitters present at the same time. From the cluster ids and the features within a cluster, words, phrases and radar finite state machines are built hierarchically.

Figure 6:
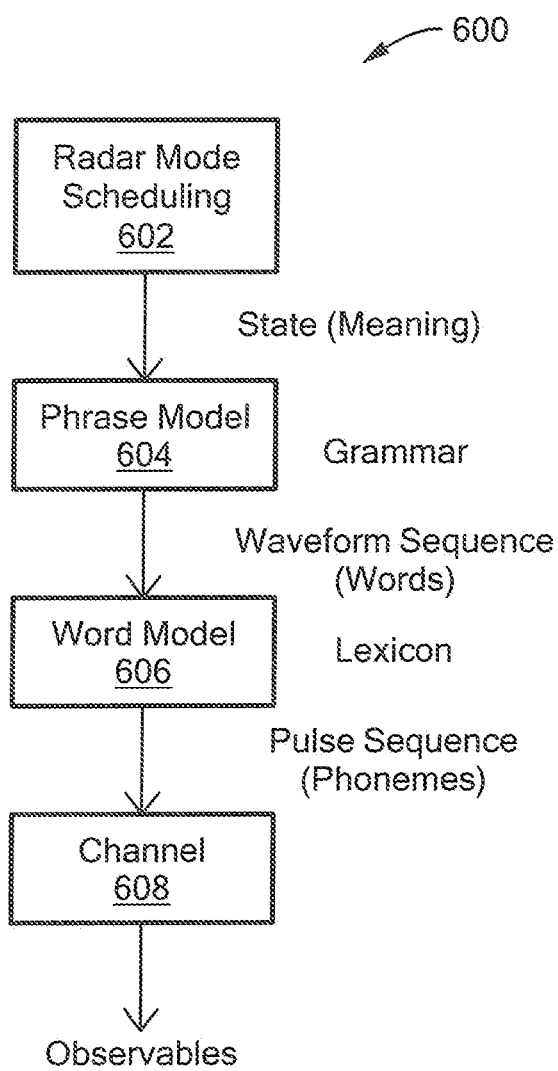
FIG. 6 is a flow diagram for ES reasoning with speech processing analogs.

FIG. 6 shows an illustrative hierarchical radar model 600 with speech recognition analogues for ES intent recognition. Radar mode scheduling 602 includes various states followed by a phrase model 604, followed by a word model 606, followed by a channel model 608 generating pulses that are observable. The radar modes include states such as search, acquisition and track. The phrase model 604 has a waveform sequence with a grammar analog in speech processing. A pulse sequence of the word model 606 has an analog of speech phonemes.

As is known in the art, automatic speech recognition (ASR) approaches include weighted finite state transducers (WFST) that have a common framework with shared processing for hierarchical representation and processing. The AT&T FSM library facilitates tools available for different operators to be operated on finite state automaton and transducer in generating complex FSMs/HMMs. These tools comprise approximately 30 operations. HMMs have been successfully used in real-time speech recognition and most commercially available speech recognition systems are based on this technology.

Figure 7:
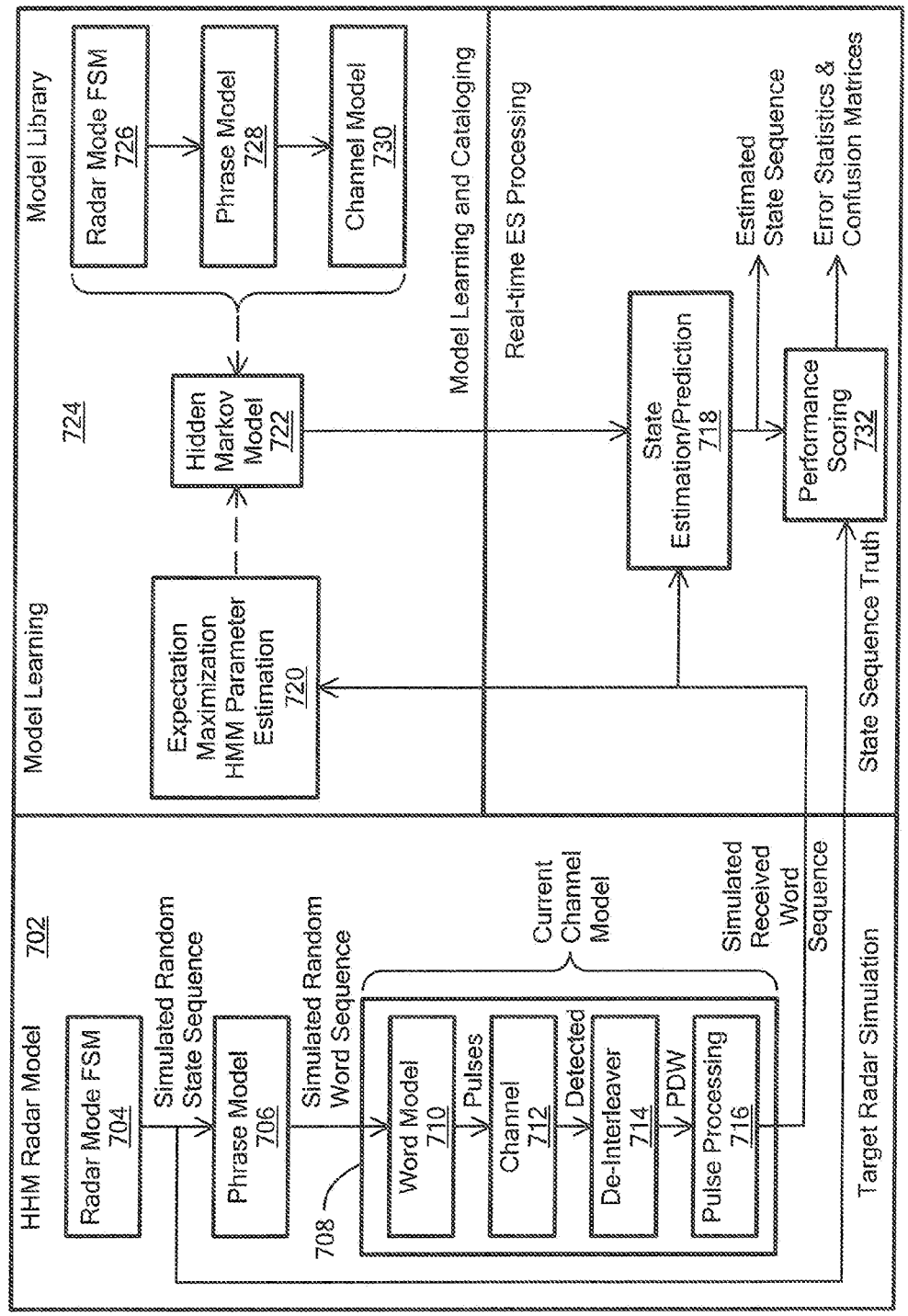
FIG. 7 is a schematic representation of an ES system.

FIG. 7 shows an illustrative ES reasoning engine 700 in simulation. The left hand side of the figure "HMM Radar Model" is used to simulate data for the purposes of learning and verifying the performance. This HMM radar model 702 includes a radar mode FSM 704 with a simulated state sequence received by a phrase model 706 that outputs a simulated word sequence. A current channel model 708 includes a word model 710, a channel model 712, a de-interleaver module 714, and a pulse processing module 716. The current channel model 708 outputs a simulated received word sequence from the radar model 702. These simulated word sequences are used in "Model Learning" upper part of left hand side of FIG. 7. For learning these are input to Expectation maximization HMM parameter estimation 720. The output is learned HMM model which includes radar mode FSM 726, phrase model 728 and channel model 730. The learned model and the estimated word sequence are input to a state estimation/prediction 718. The output of 718 is an estimated state sequence. This is also input to performance scoring 732 with the state sequence truth to verify how close the estimated/predicted state is to the truth. This helps in benchmarking the accuracy of state prediction/estimation from the learned models.

Figure 8:
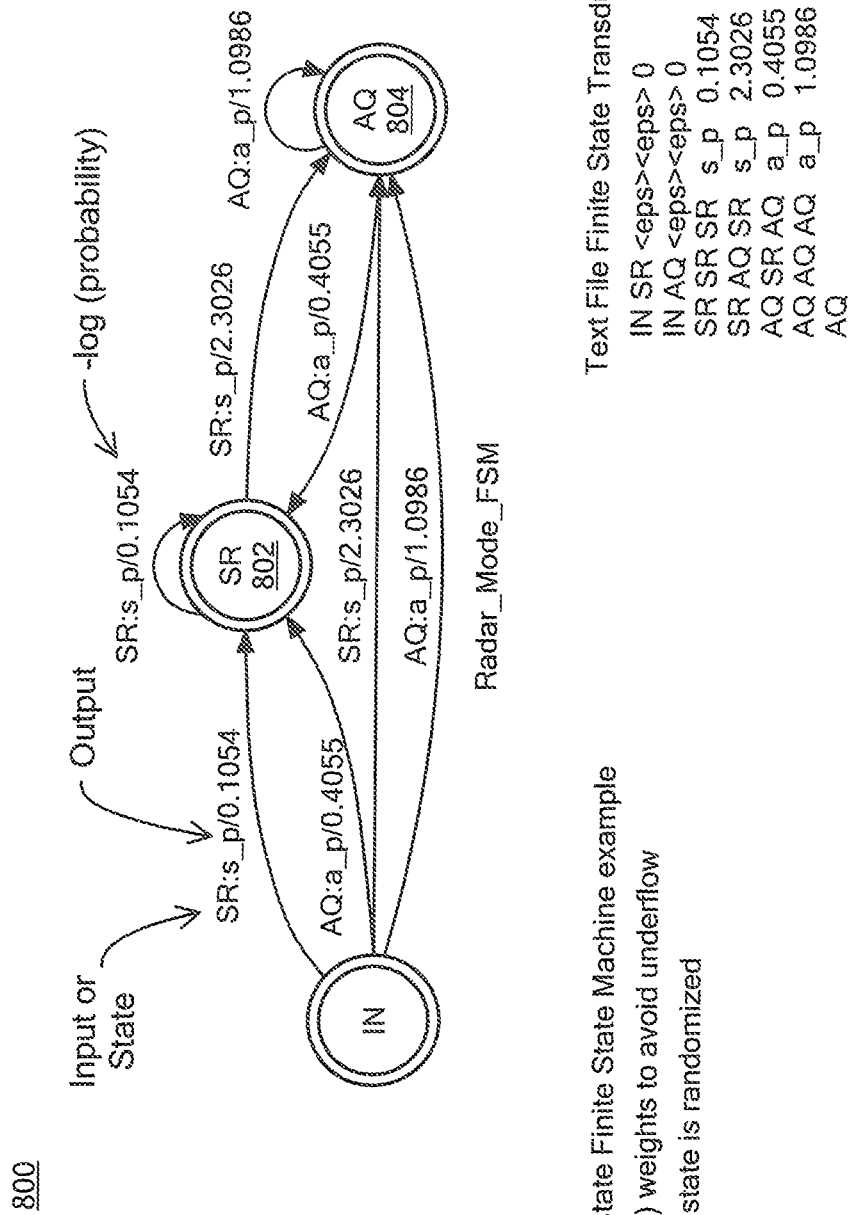
FIG. 8 is a simplified finite state machine example of a radar model with search and acquisition states.

FIG. 8 shows an illustrative weighted finite state transducer (WFST) radar mode representation 800 having a search mode 802 and an acquisition mode 804 for a two-state Finite State Machine. Each branch includes an input and an output and a negative log(probability). As can be seen, in the search mode 802, the mode can remain in search mode 802 or transition to the acquisition mode 804 with the listed probabilities, and similarly for the acquisition mode 804. It is understood that additional states, such as track and range resolution can be readily added.

Figure 9A:
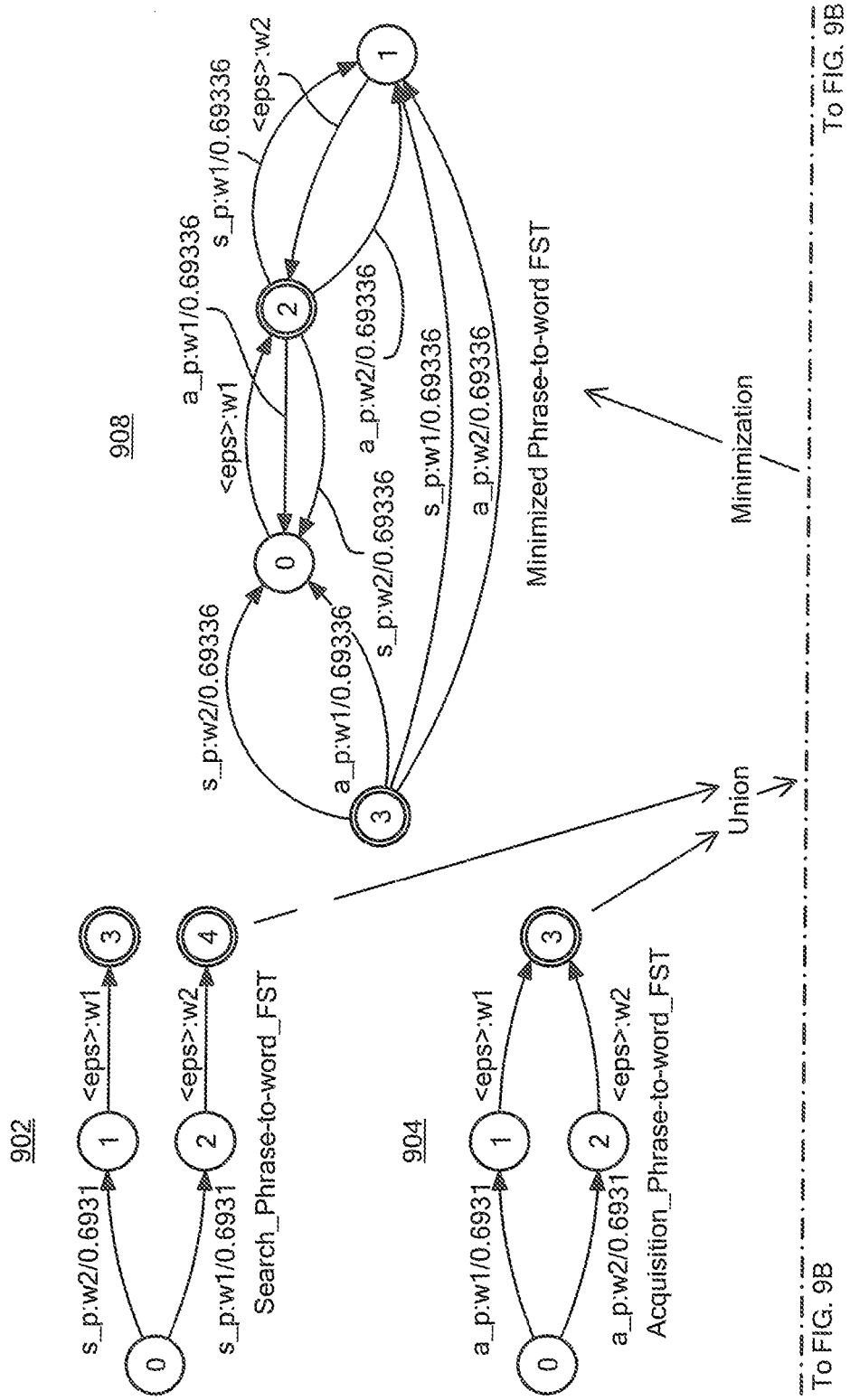
FIGS. 9A and 9B show a phrase to word FST generated from search and phrase to word FSTs.
Figure 9B:
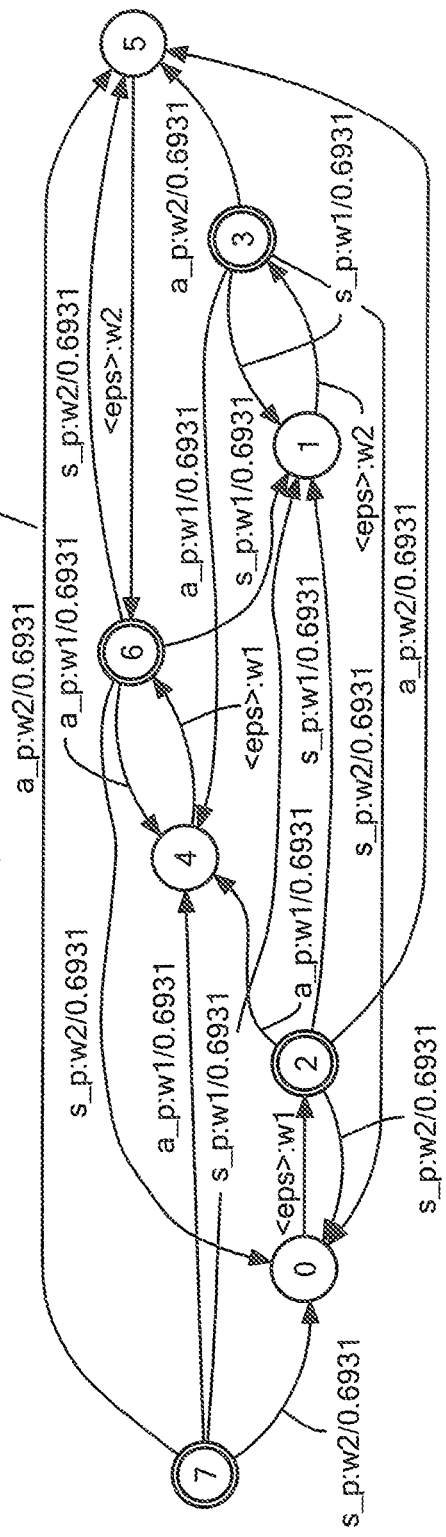

FIGS. 9A and 9B show an illustrative phrase production model construction 900. A search phrase to word FST 902 includes branches having an input, output, and probability for generating first and second words w1, w2. Similarly, an acquisition phrase to word FST 904 generates first and second words w1, w2. The two FSTs 902, 904 can be combined, such as by performing a union operation, to generate a phrase to word FST 906, which can be minimized using minimize operation to form a minimized phrase to word FST 908.

Figure 10A:
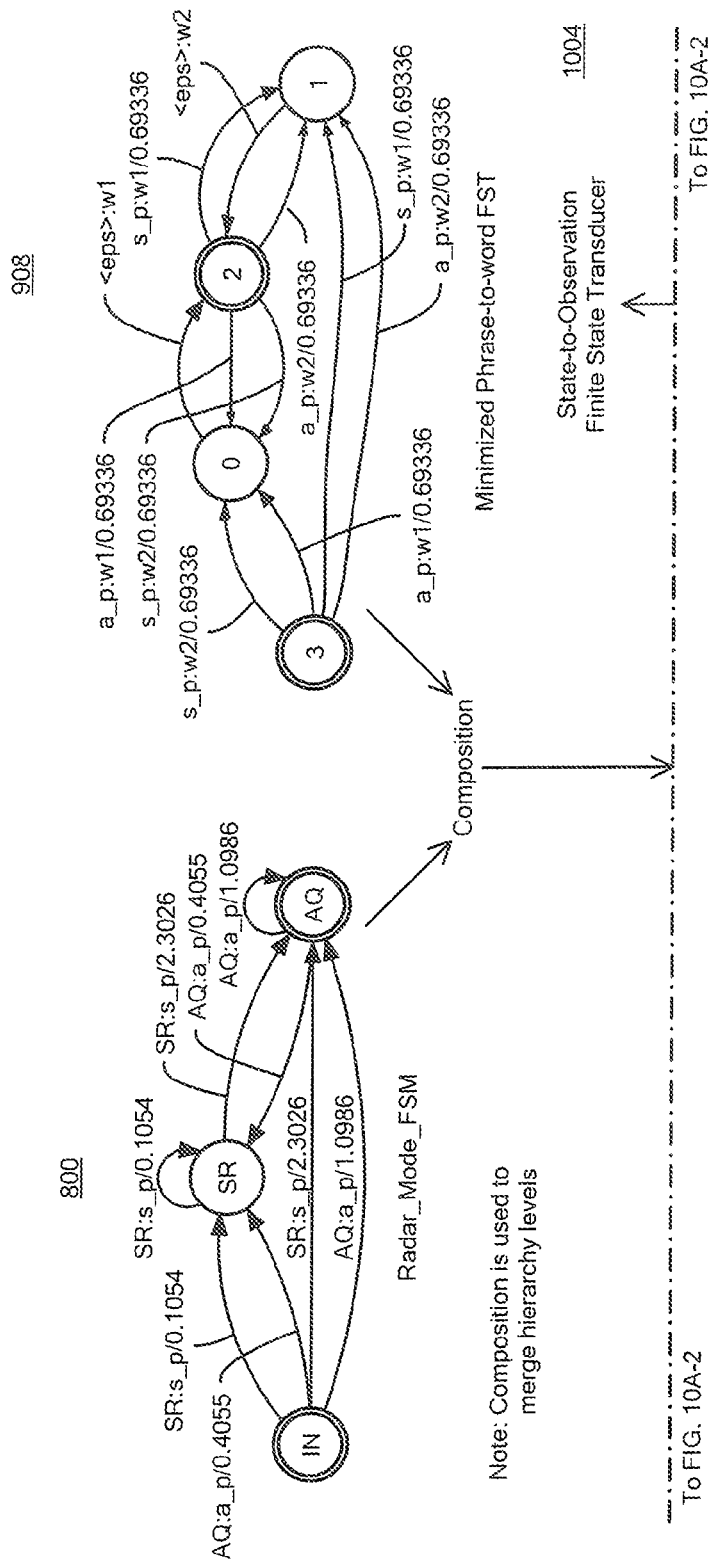
FIGS. 10A and 10B show a radar state to word FST generated from composition of a radar mode FSM and a phrase to word FST.
Figure 10B:
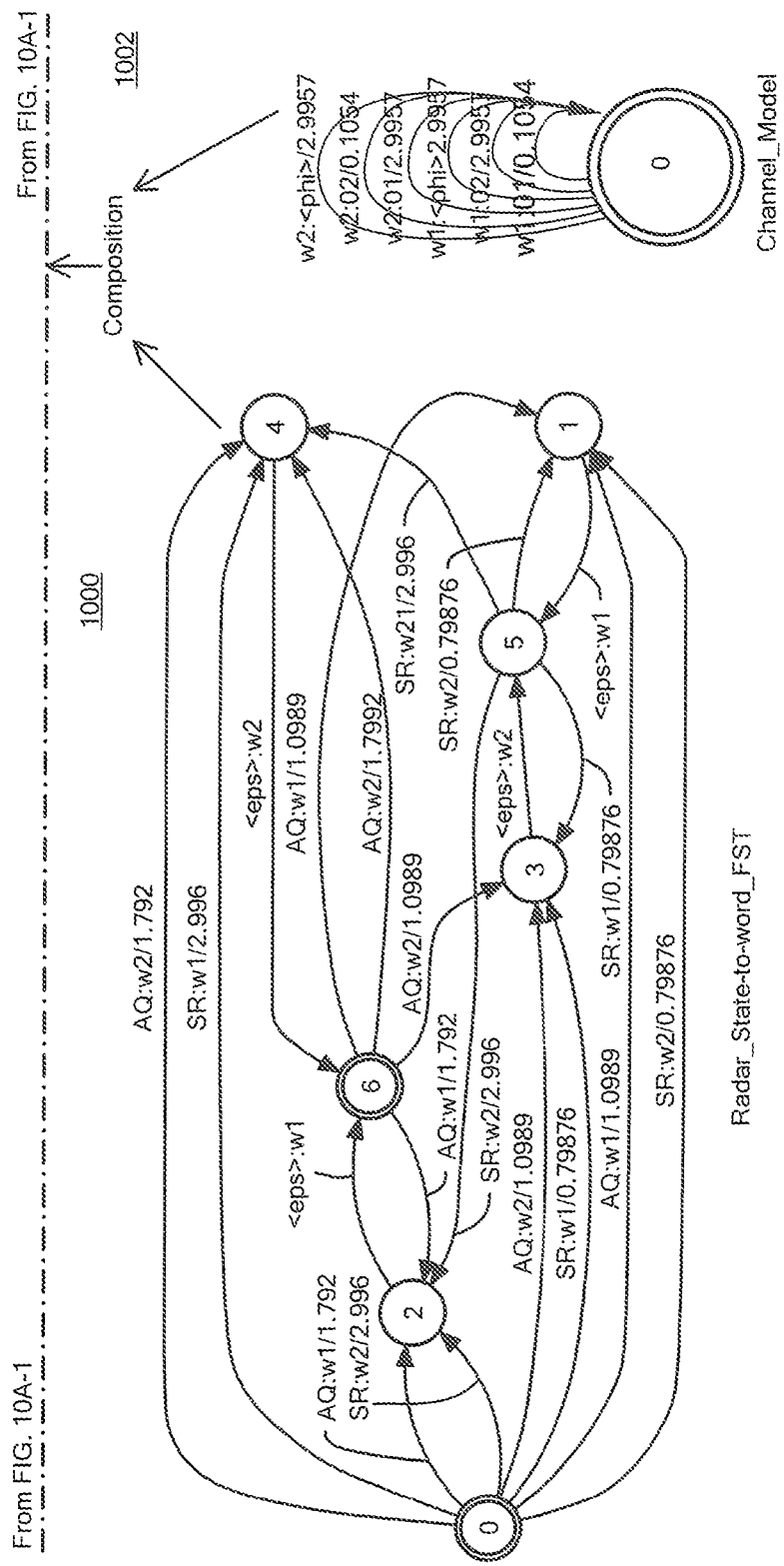
Figure 10C:
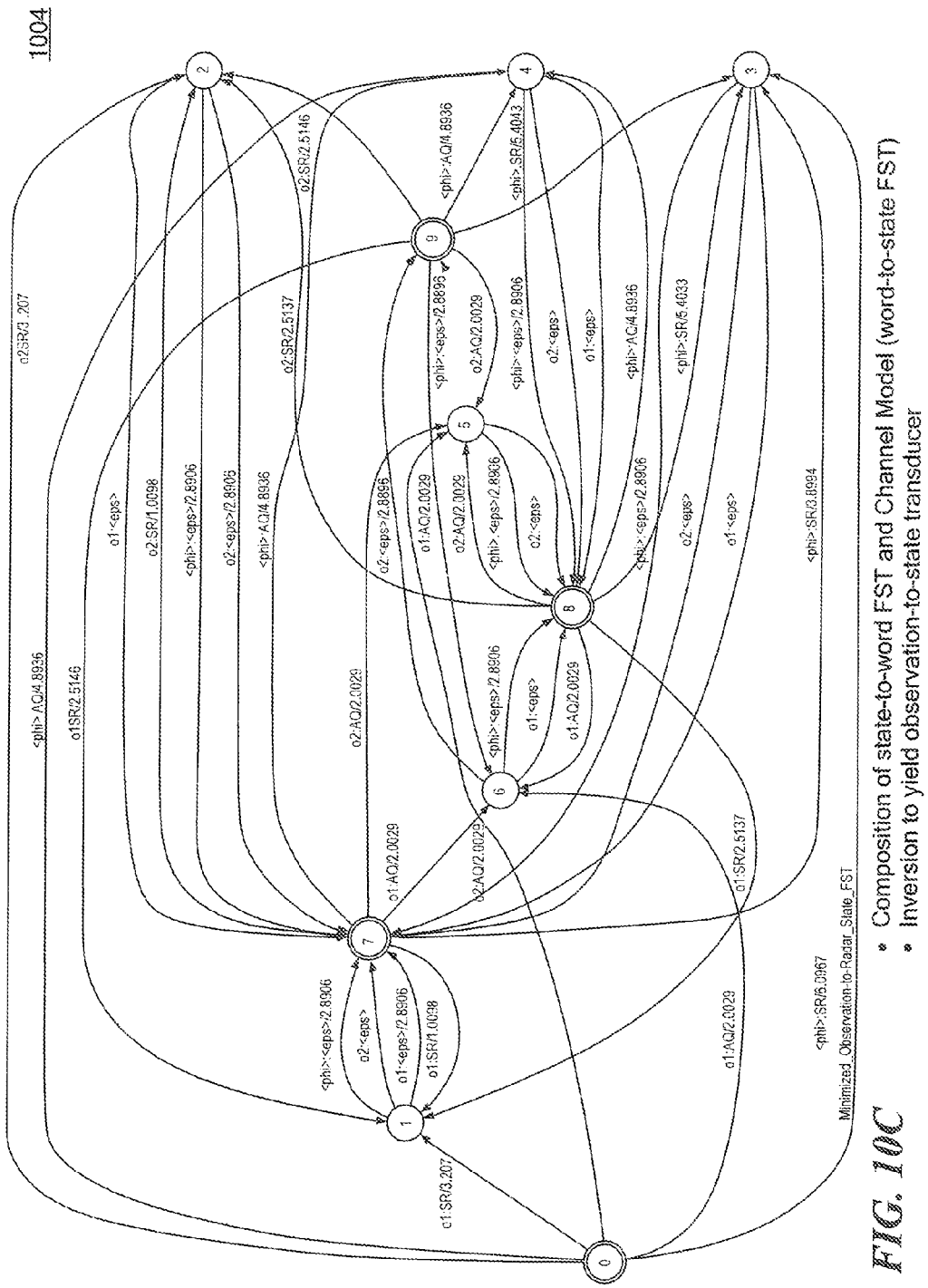
FIG. 10C shows a state to observation transducer generated from the radar state to word FST of FIGS. 10A and 10B and a channel model.

FIGS. 10A and 10B show a state-to-observation transducer construction using composition operator. Composition of the radar mode FSM 800 of FIG. 8 and the minimized phrase to word FST 908 of FIGS. 9A and 9B results in a radar state to word FST 1000. The radar state to word FST 1000 can be combined with a channel model 1002 via composition operation to provide a state-to-observation FST 1004 shown in FIG. 10C.

Figure 11:
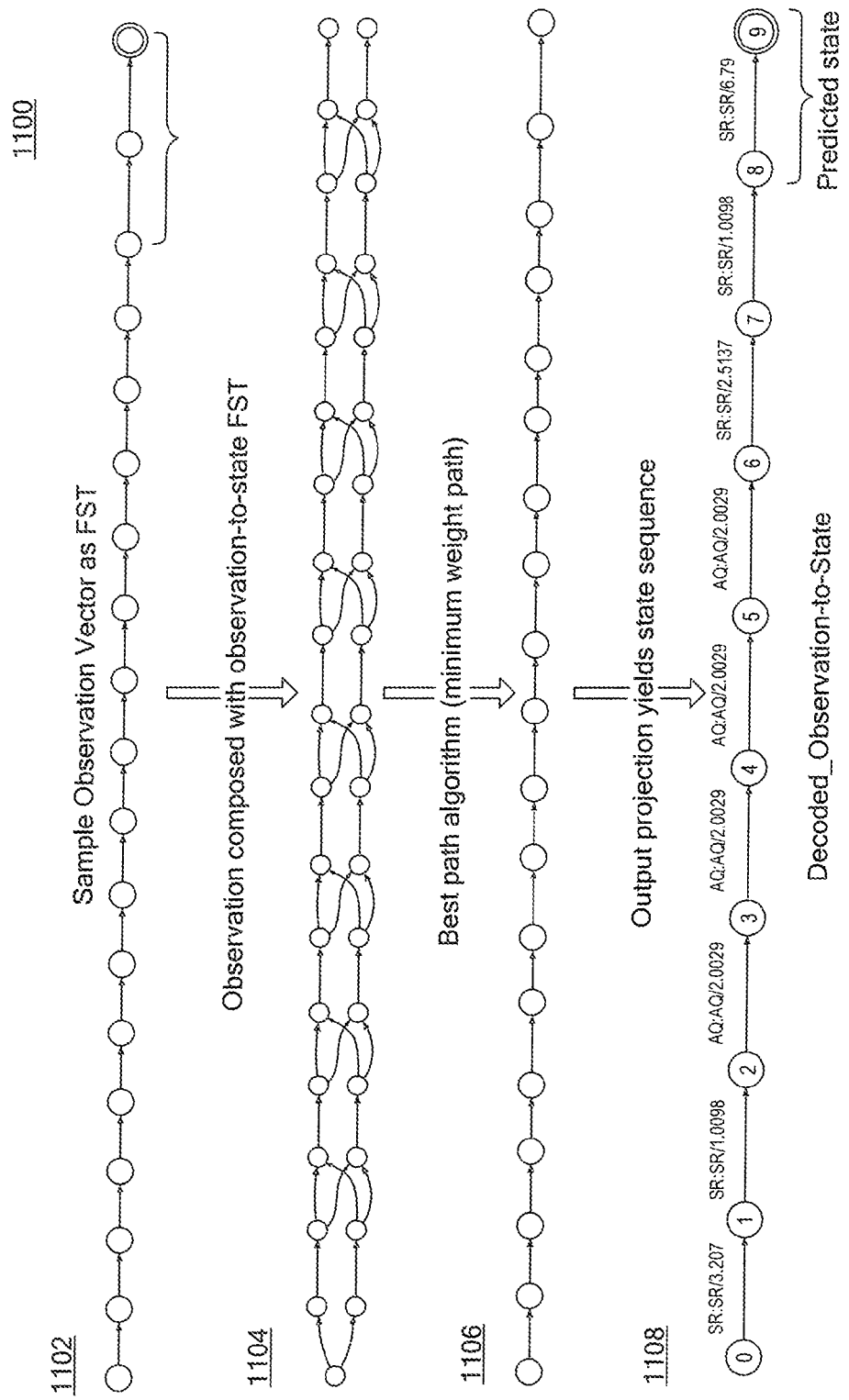
FIG. 11 shows a state estimation/prediction example via composition with an observation vector.

FIG. 11 shows a state estimation/prediction 1100 example using composition with an observation vector having predicted future states appended. An observation vector FST 1102 is composed with an observation-to-state FST to provide an output 1104, on which best path processing is performed to generate an output 1106. Output projection yields a state sequence 1108 having predicted states.

Figure 12:
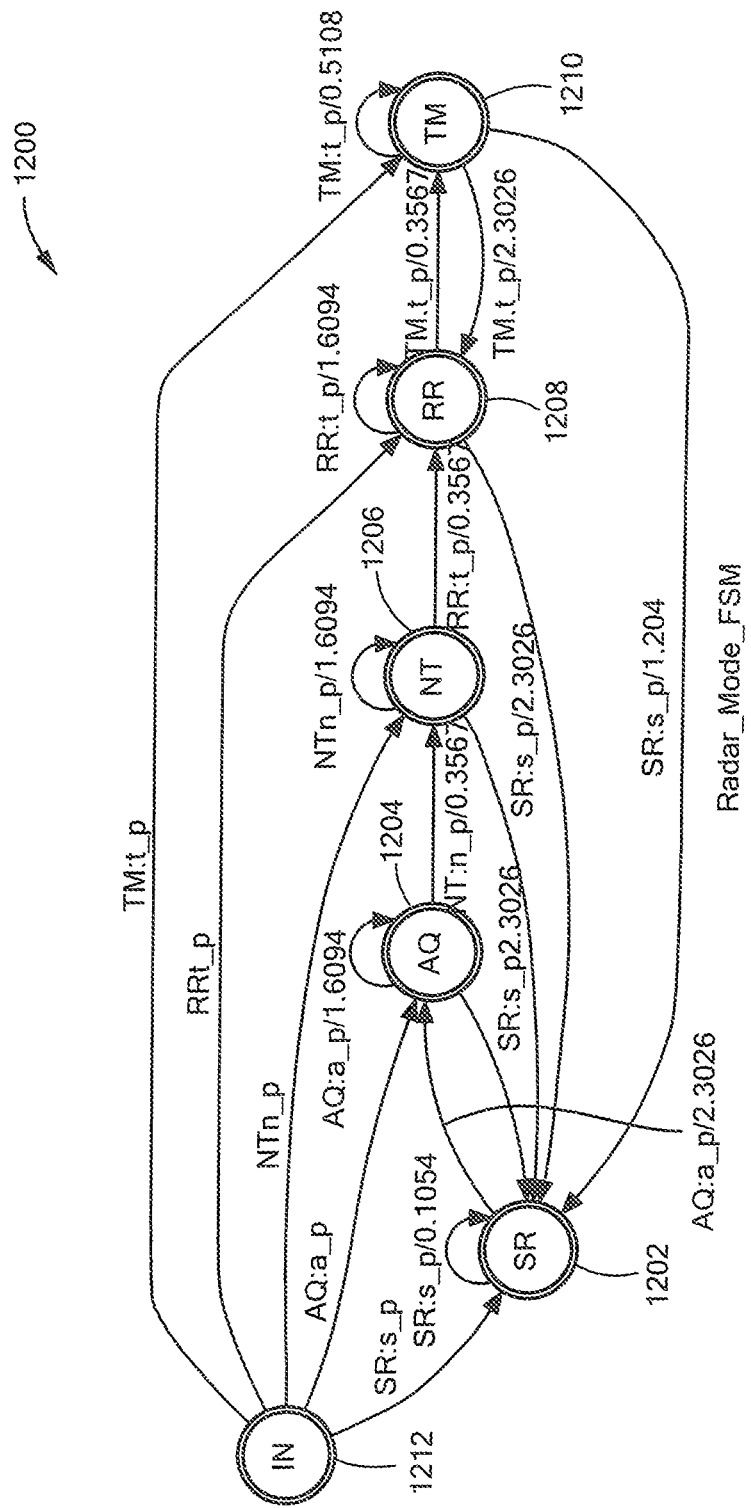
FIG. 12 is a radar mode model represented by a weighted finite state transducer.

FIG. 12 shows an illustrative learned radar model represented by a weighted radar mode FST 1200 for the radar of FIG. 1 having search mode 1202, an acquisition mode 1204, a non-adaptive track mode 1206, a range resolution mode 1208, and a track maintenance mode 1210. As noted above, the branches having an input, output and log probability. In the illustrative FST, there is a uniformly distributed random initial state 1212. As can be seen, all states except the initial state 1212 can be final states.

Figure 13A:
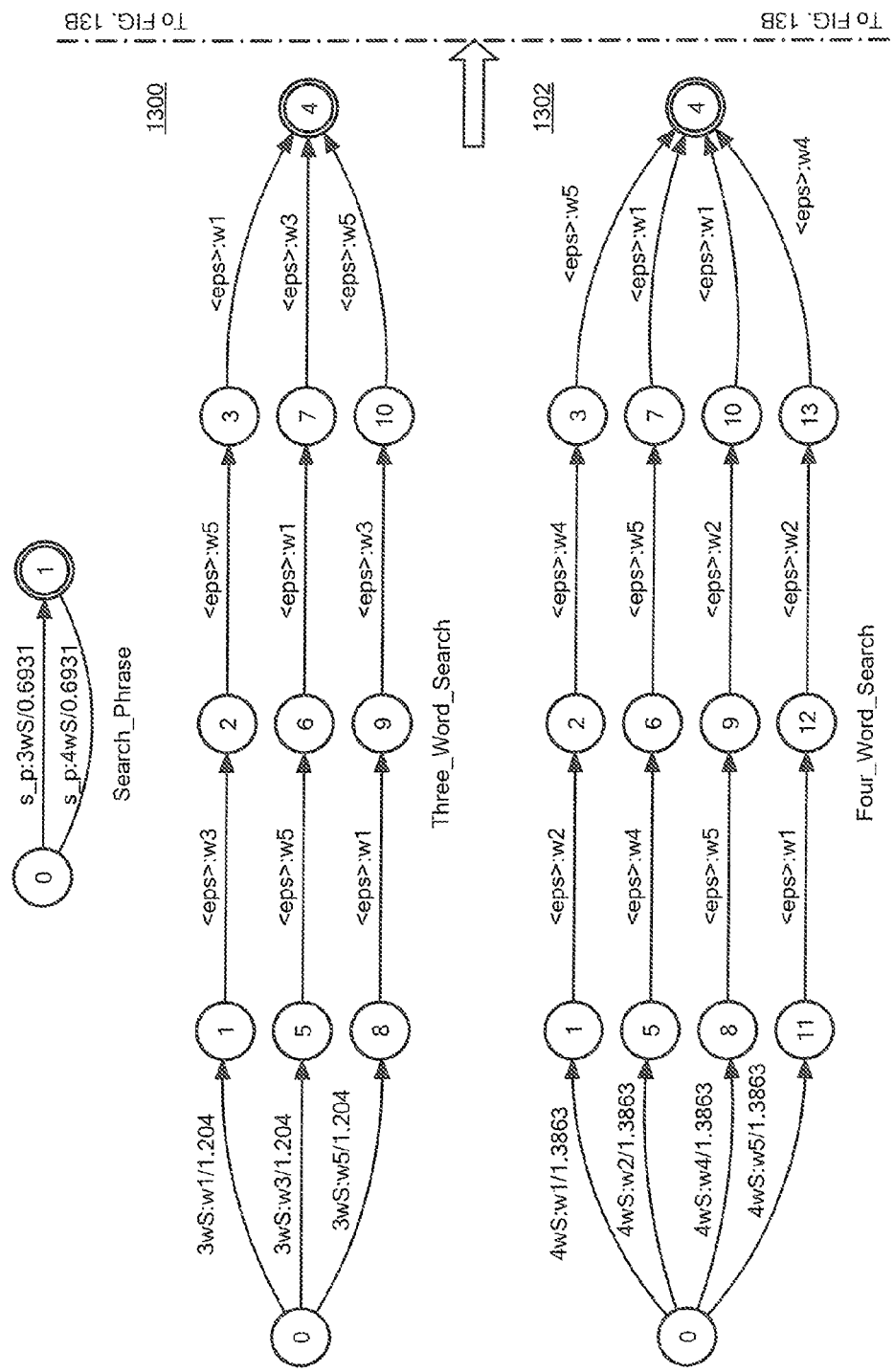
FIGS. 13A and 13B show generation of a search phrase from word FST.
Figure 13B:
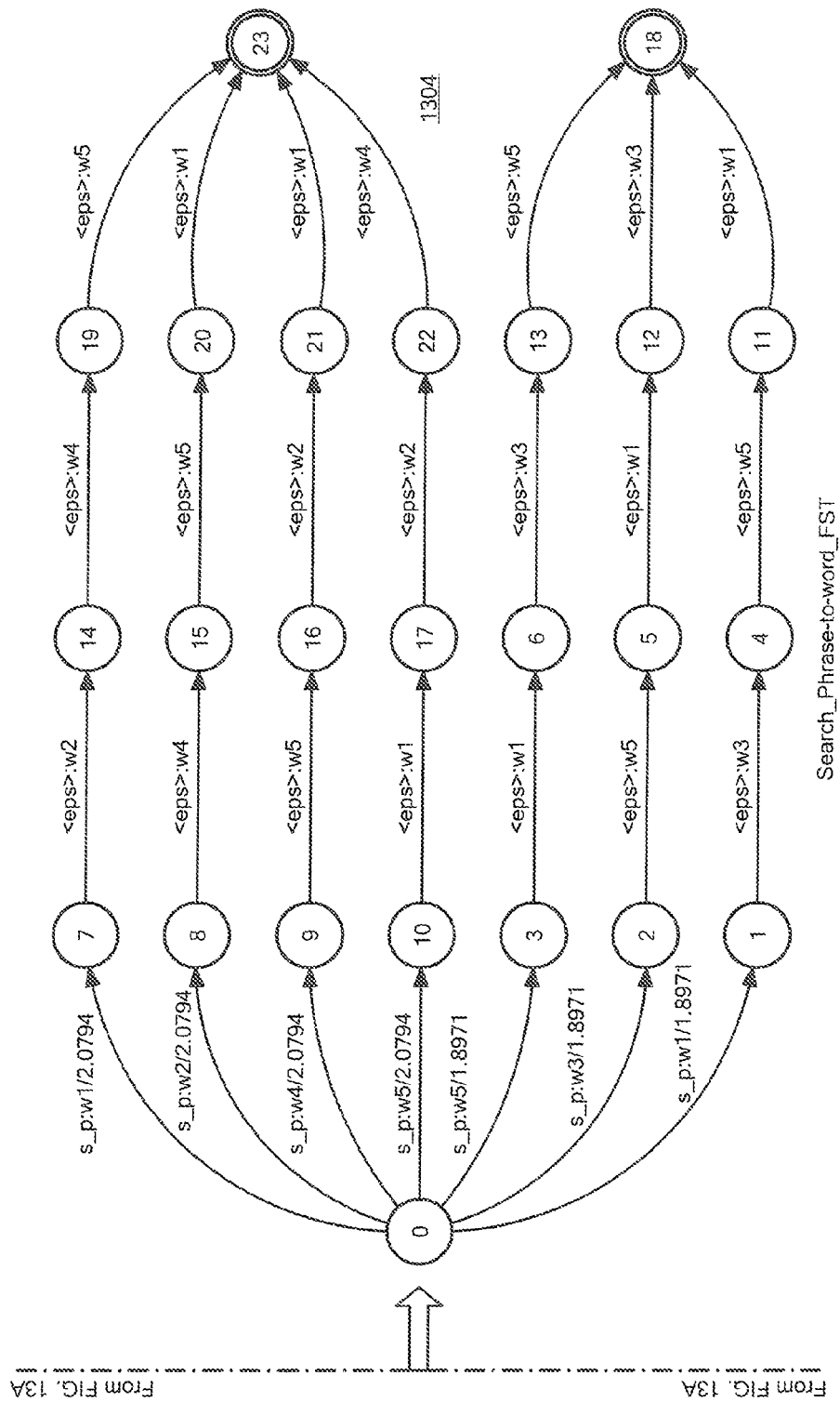
Figure 14A:
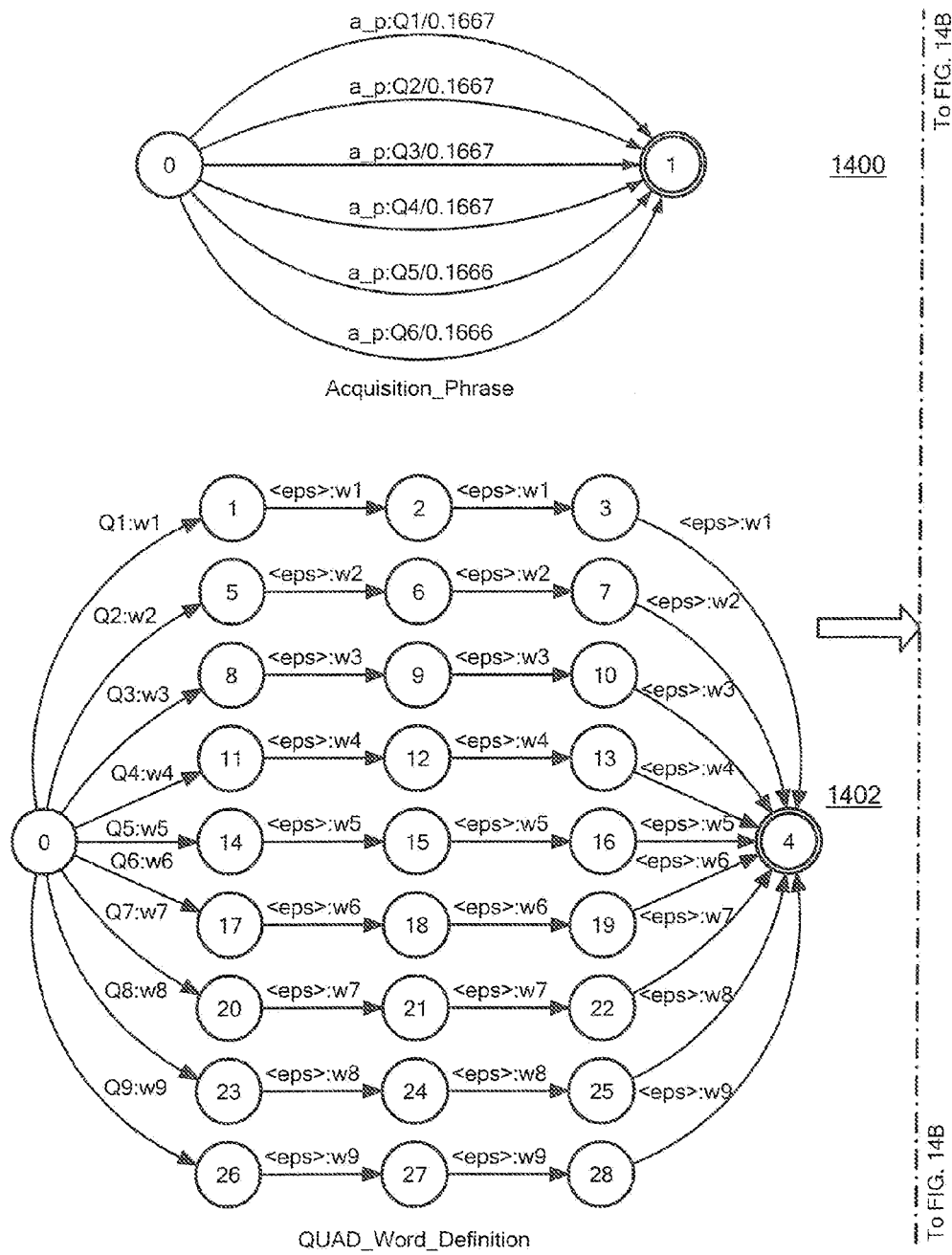
FIGS. 14A and 14B show generation of an acquisition phrase from word FST.
Figure 14B:
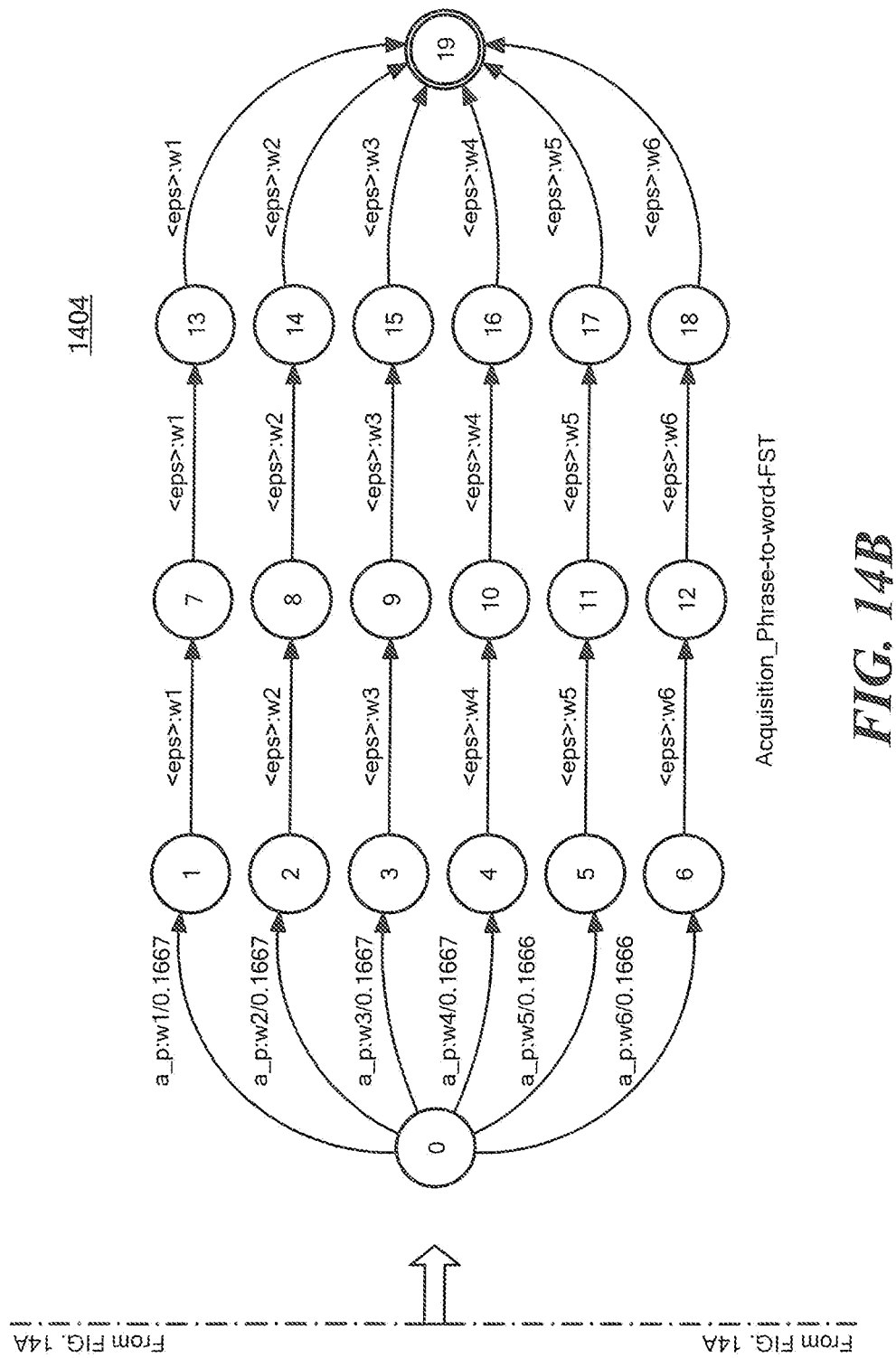
Figure 15A:
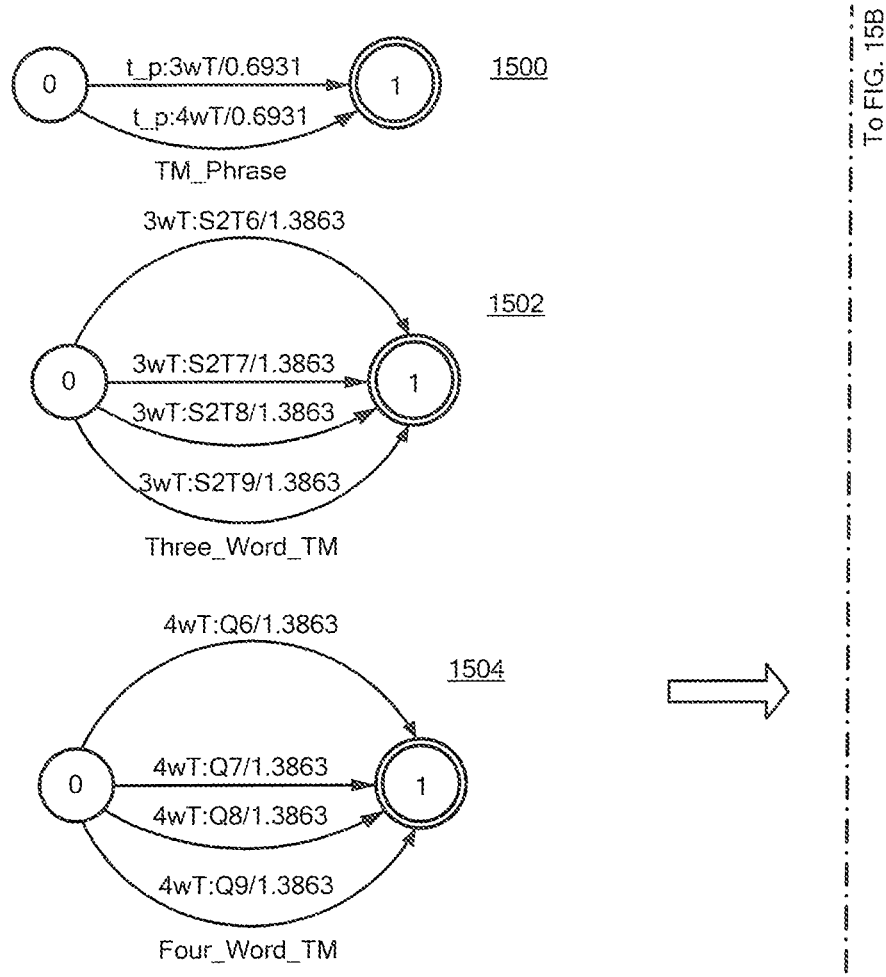
FIGS. 15A and 15B show a track maintenance track phrase from word FST.
Figure 15B:
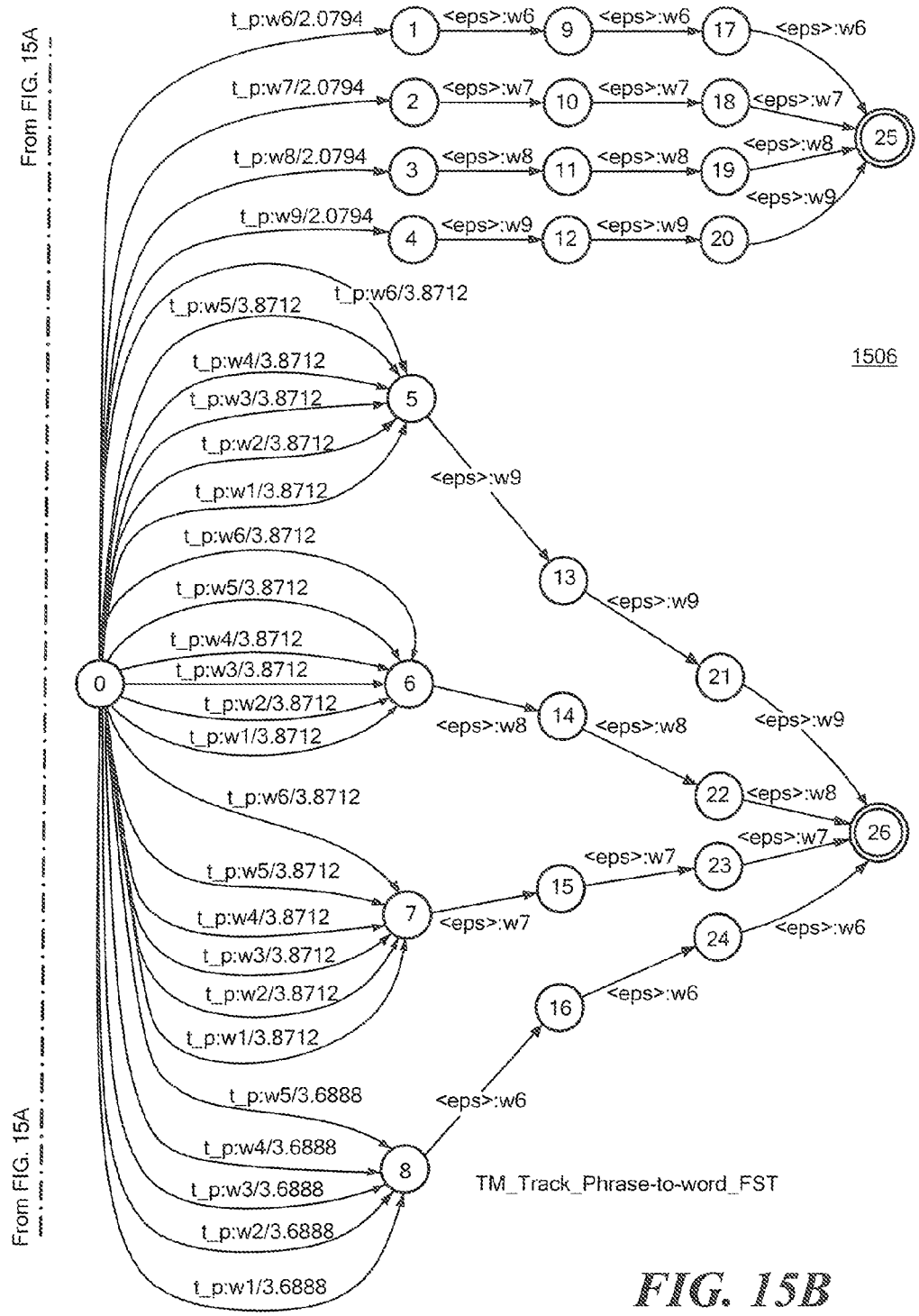
Figure 16:
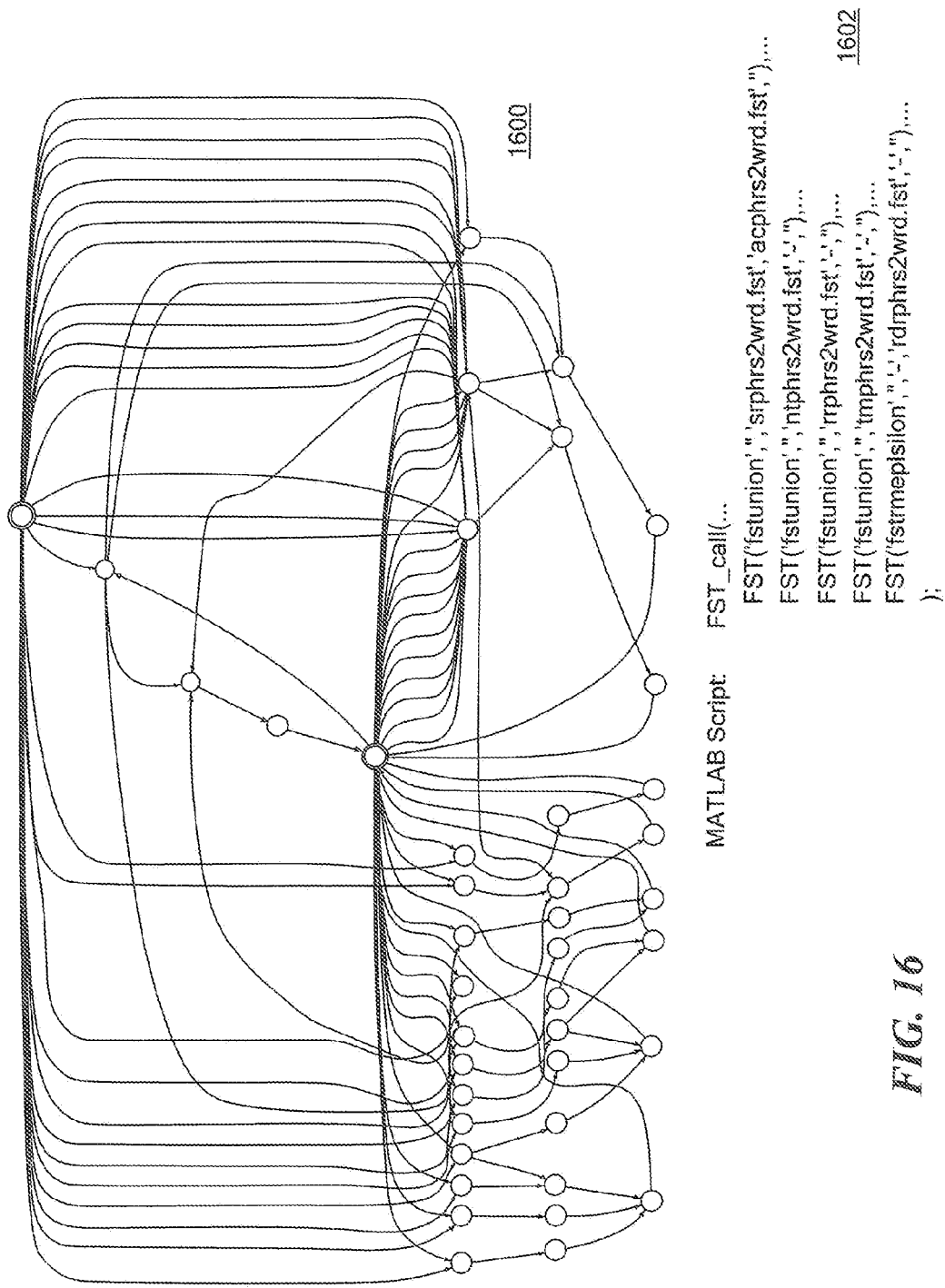
FIG. 16 shows a phrase to word FST.
Figure 17:
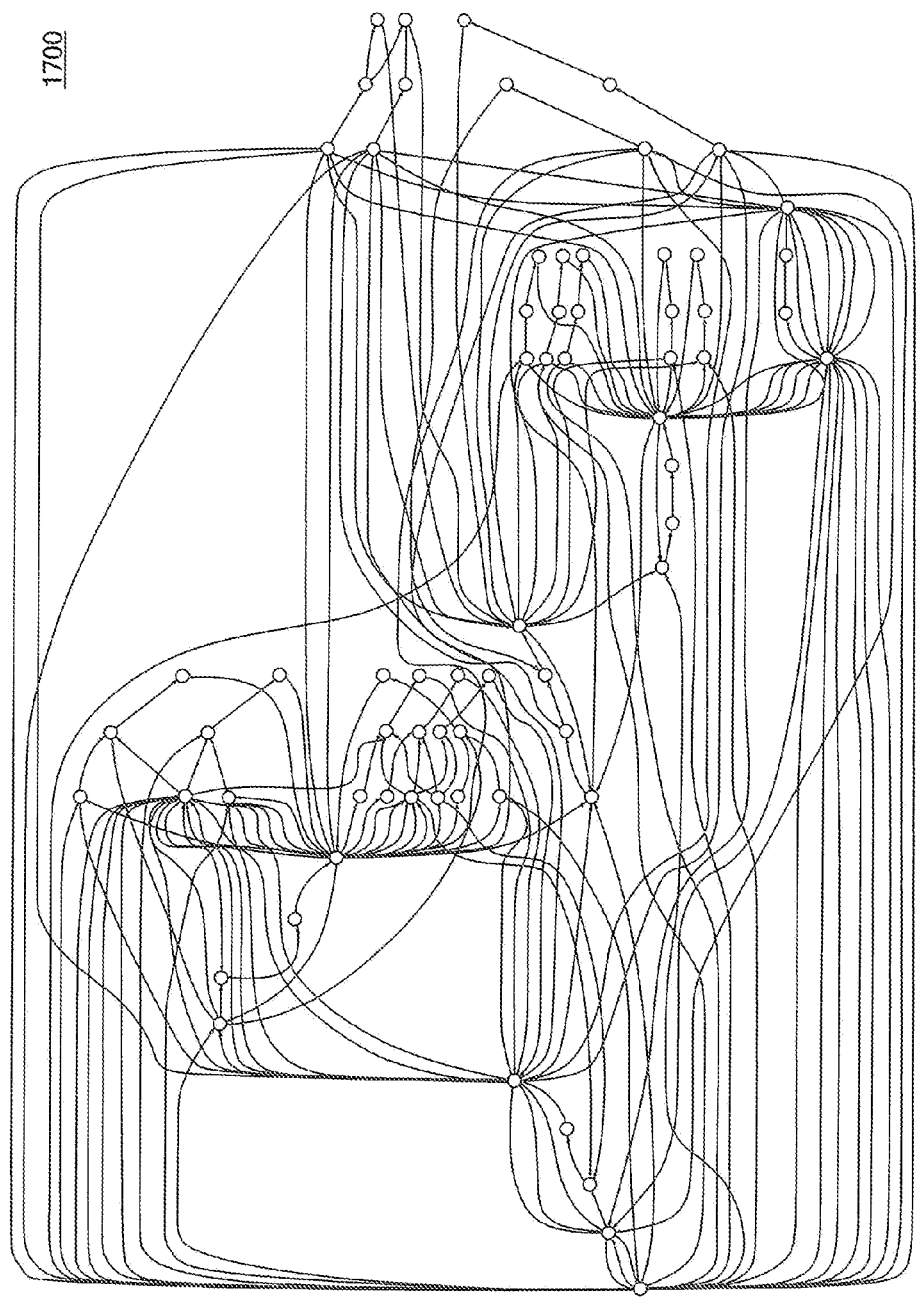
FIG. 17 shows a state to word FST.
Figure 18:
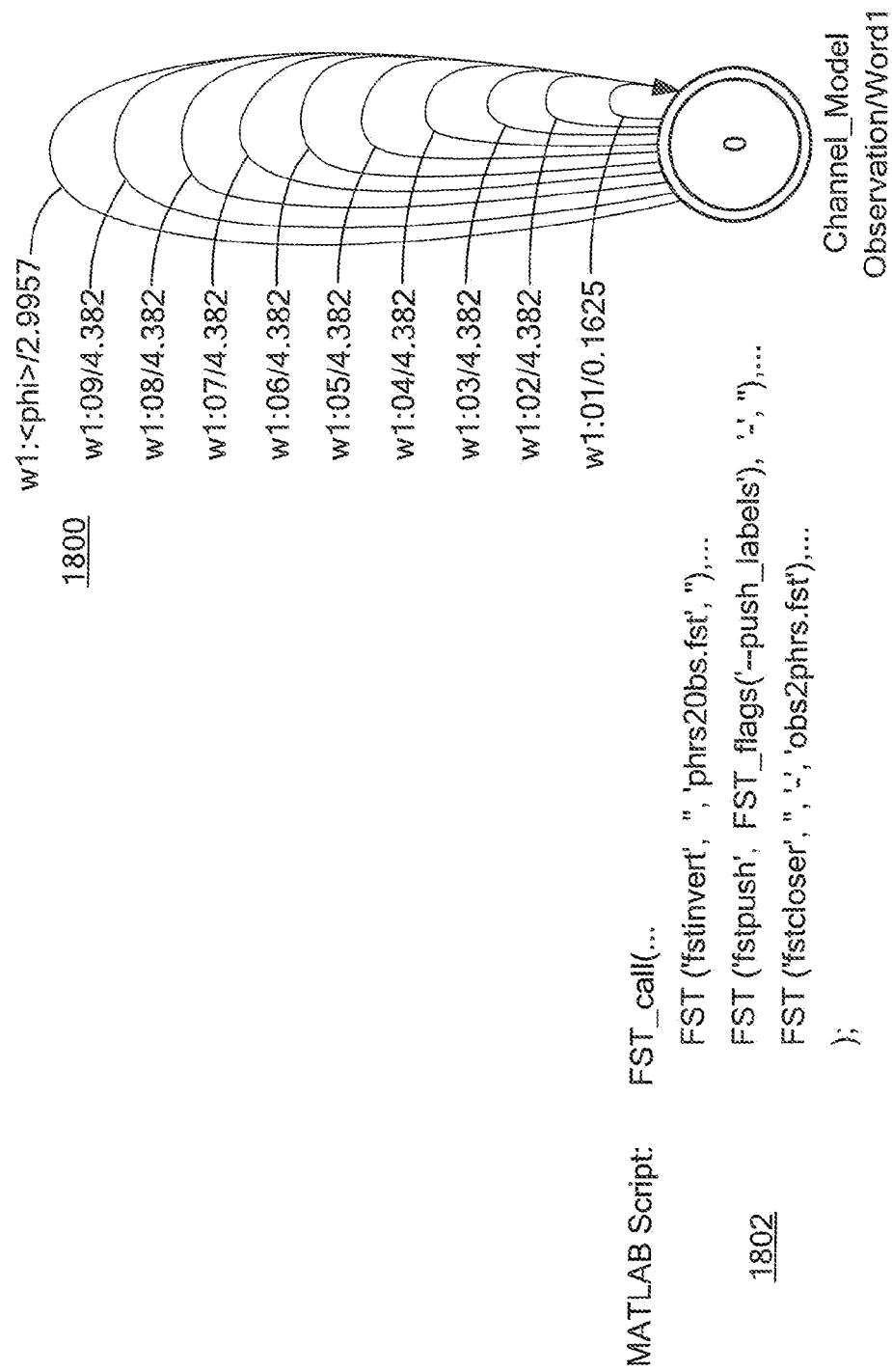
FIG. 18 shows a channel model.

FIGS. 13A and 13B show composition of search phrase FSTs of FIG. 1. Composition is performed on a three word search 1300 and a four word search 1302 to generate a search phrase to word FST 1304. FIGS. 14A and 14B show the acquisition phrase 1400 composed with a quad word definition 1402 to provide an acquisition phrase to word FST 1404. FIGS. 15A and 15B shows a track maintenance phrase 1500 along with a three Word™ 1502 and a four Word™ 1504. Composition generates a TM track phrase to word FST 1506. An illustrative MATLAB script 1508 shows the composition process. FIG. 16 shows a phrase to word FST 1600 from a union of individual mode phrase FSTs. An illustrative script 1602 is shown to perform the process. FIG. 17 shows a state to word FST 1700 from a composition of the state to phrase FST and phrase to word FST (1600). FIG. 18 shows a channel model 1800 with a probability of observation/transmitted word. The model 1800 models the effects of receiver noise, e.g., receiver decision errors, and de-interleaver errors, as well as drop outs (phi). Composition of the state to word FST with the channel model 1800 yields state to observation information. Inversion yields mapping from observation to state FST. An illustrative MATLAB script 1802 is shown.

Figure 19:
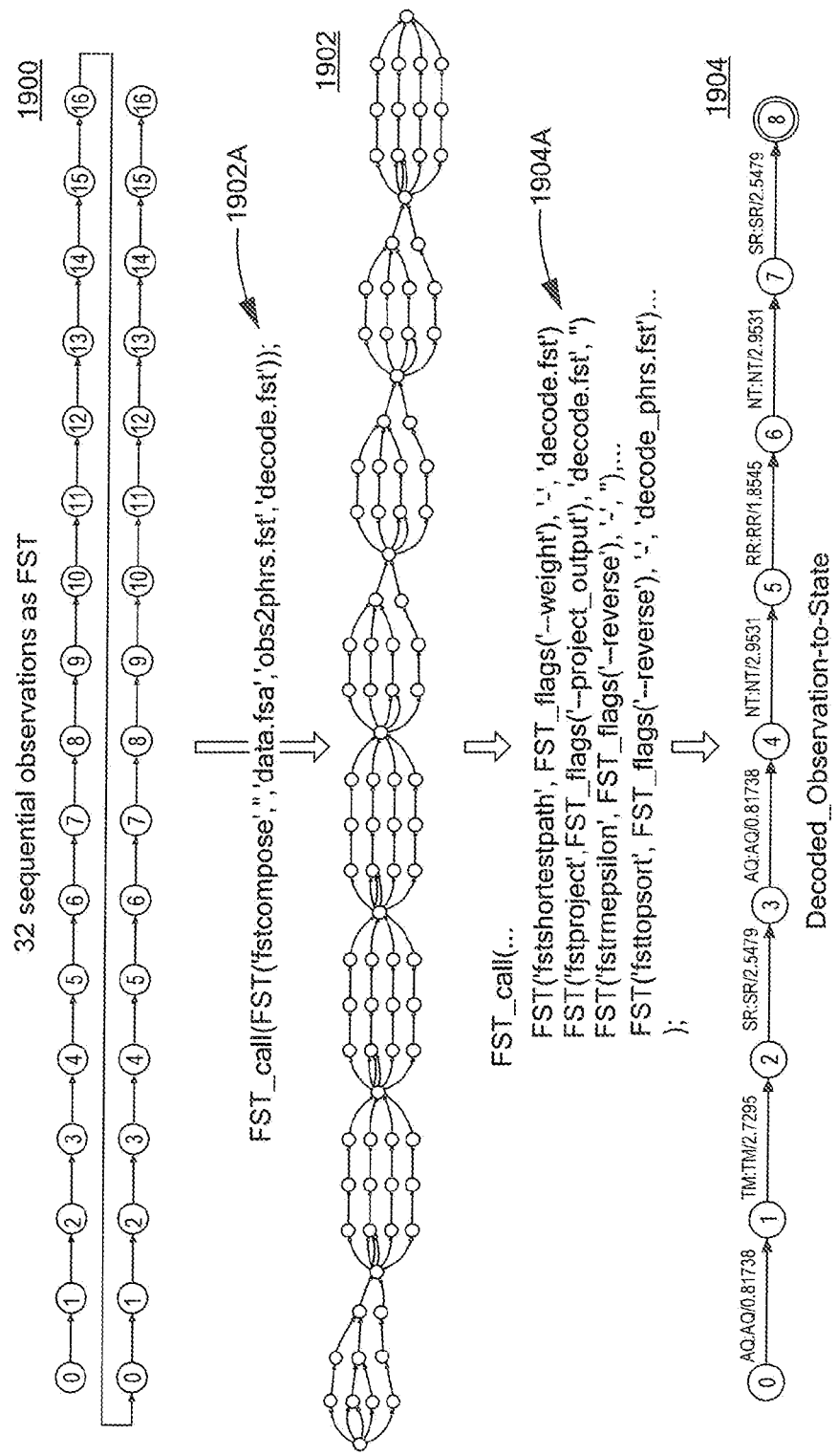
FIG. 19 shows generation of a decoded observation to state model.
Figure 20:
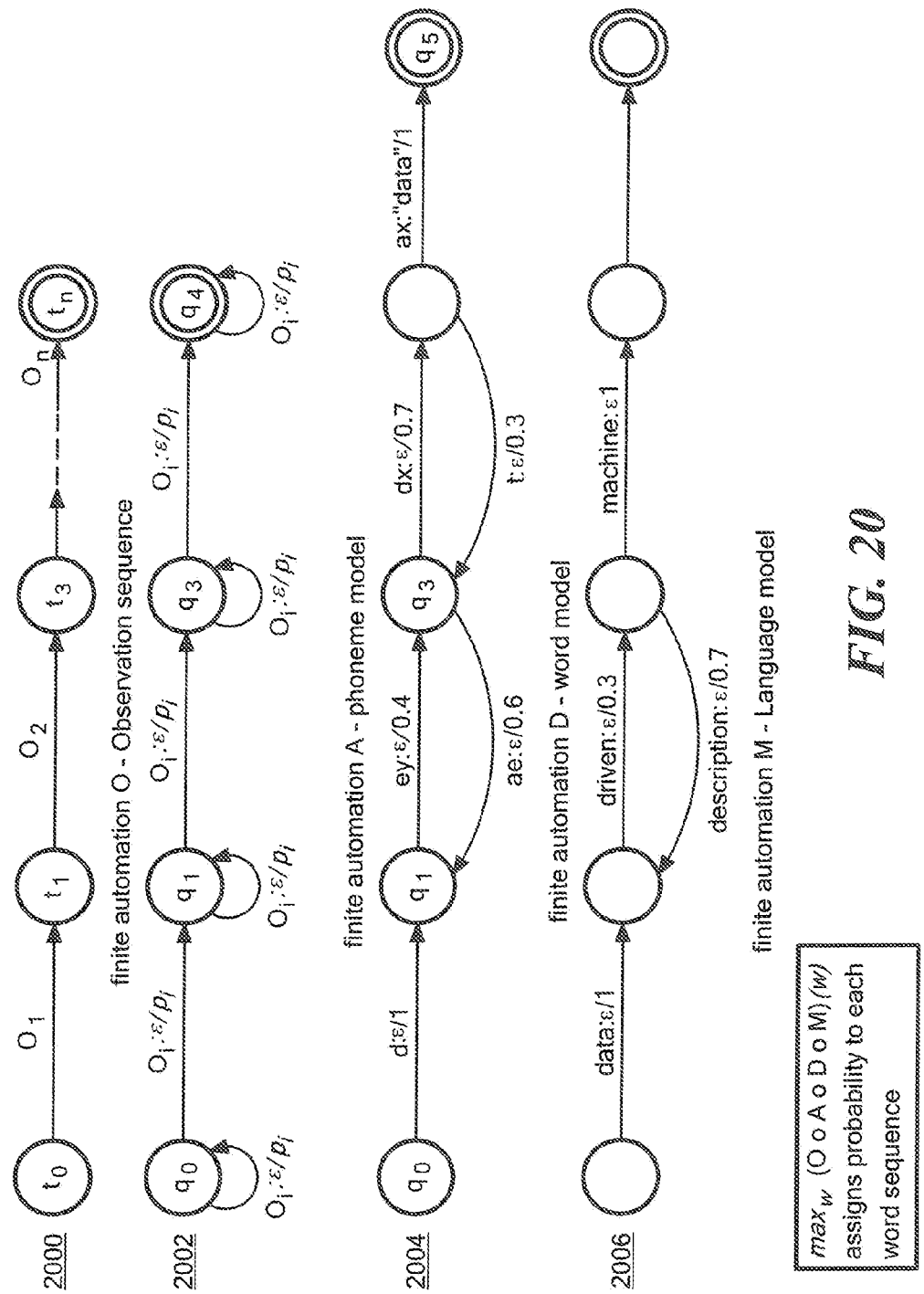
FIG. 20 shows application of finite state machine operations for speech recognition.

FIG. 19 shows an illustrative overall MLE process of decoding states (uncovering state sequence) from observations. It starts with decoding phrases 1902 from the observations FST 1900 and ends with decoding states 1904 from the decoded phrases. The FST operations applied in this MLE process are shown 1902A and 1904A.

Figure 21:
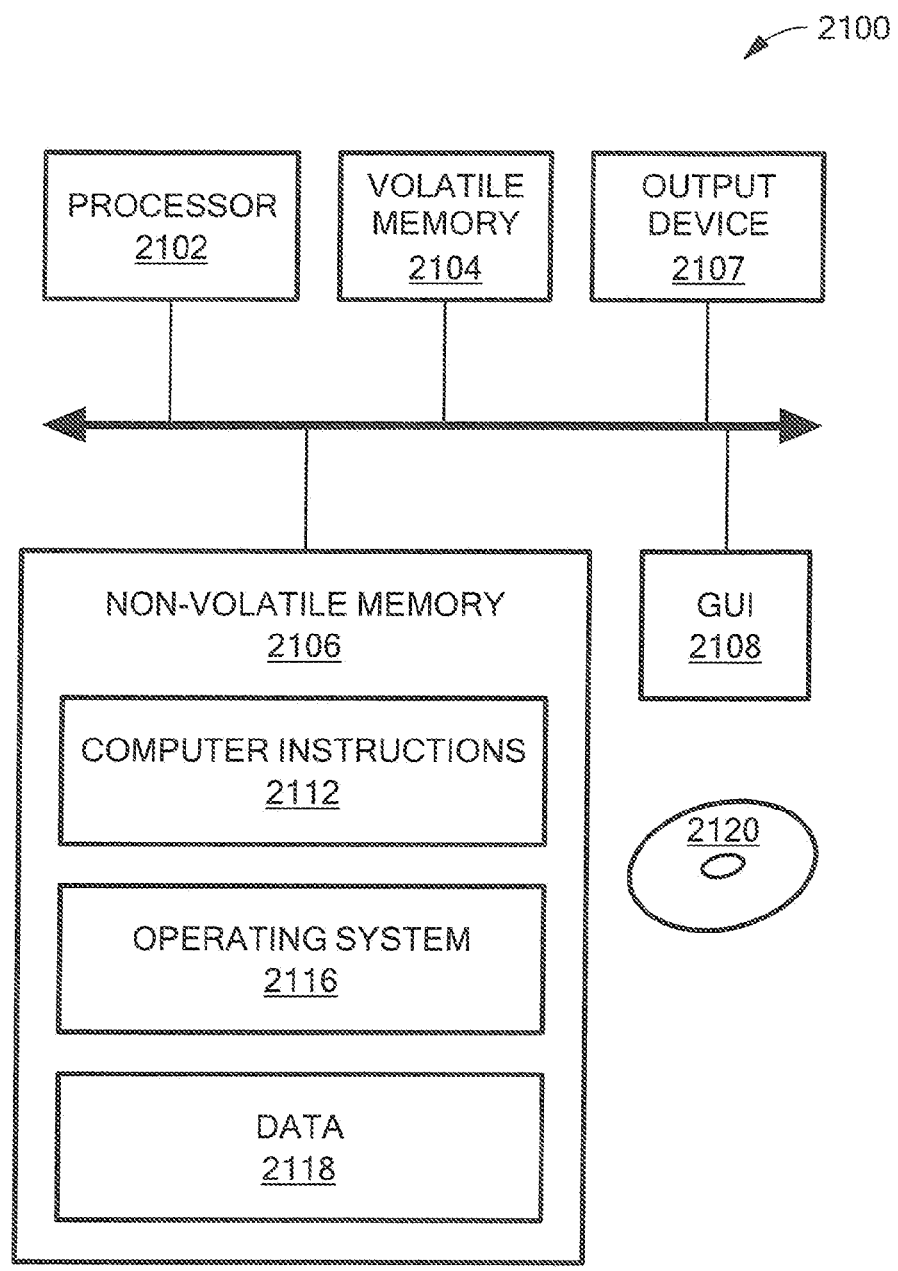
FIG. 21 is an illustrative representation of a computer that can perform at least a portion of the processing described herein.

FIG. 21 shows an exemplary computer 2100 that can perform at least part of the processing described herein. The computer 2100 includes a processor 2102, a volatile memory 2104, a non-volatile memory 2106 (e.g., hard disk), an output device 2107 and a graphical user interface (GUI) 2108 (e.g., a mouse, a keyboard, a display, for example). The non-volatile memory 2106 stores computer instructions 2112, an operating system 2116 and data 2118. In one example, the computer instructions 2112 are executed by the processor 2102 out of volatile memory 2104. In one embodiment, an article 2120 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method, comprising:
   receiving radar pulses from an unknown radar emitter at an input of a radar warning system;
   processing the received pulses using a weighted finite state machine implemented in the radar warning system to learn a model of the unknown radar emitter; storing the learned model in memory on the radar warning system;
   estimating, using a computer processor on the radar warning system, a state/function of the unknown radar emitter based on the received radar pulses using the stored learned model; and
   automatically building finite state machines using finite state transducers based on instructions stored in the memory.

2. The method according to claim 1, further including determining weights for the weighted finite state machine using expectation-maximization processing.

3. The method according to claim 1, further including estimating a mode of the unknown emitter as search or track from the received pulses.

4. The method according to claim 1, further including predicting a next state for the unknown emitter from a current estimated state of the unknown emitter.

5. The method according to claim 1, further including interleaving the received pulses based on adaptive stochastic weights.

6. The method according to claim 1, further including performing parsing, tracking and association of emitters.

7. The method according to claim 1, further including using human speech recognition/text processing to process the received pulses where a radar language comprises pulse sequences, which are analogous to speech phonemes, waveform sequences, which are analogous to words in human speech, and phrases, which are analogous to phrases in human speech, and states, which are analogous to a sentence in human speech.

8. The method according to claim 7, further including estimating a state/function of the unknown emitter from combinations of the received pulses.

9. An article, comprising:
a non-transitory computer readable medium having instructions stored thereon such that in response to the instructions executed by a processor, the processor performs steps which enable the processor to:
receive radar pulses from an unknown radar emitter at an input of a radar warning system;
process the received pulses using a weighted finite state machine implemented in the radar warning system to learn a model of the unknown radar emitter;
store the learned model in memory on the radar warning system;
estimate a state/function of the unknown radar emitter based on the received radar pulses using the stored learned model; and
automatically build finite state machines using finite state transducers based on instructions stored in the memory.

10. The article according to claim 9, wherein in response to the instructions executed by the processor, the processor further performs steps which enable the processor to determine weights for the weighted finite state machine using expectation-maximization processing.

11. The article according to claim 9, wherein in response to the instructions executed by the processor, the processor further performs steps which enable the processor to estimate a mode of the unknown emitter as search or track from the received pulses.

12. The article according to claim 9, wherein in response to the instructions executed by the processor, the processor further performs steps which enable the processor to predict a next state for the unknown emitter from a current estimated state of the unknown emitter.

13. The article according to claim 9, wherein in response to the instructions executed by the processor, the processor further performs steps which enable the processor to interleave the received pulses based on adaptive stochastic weights.

14. The article according to claim 9, wherein in response to the instructions executed by the processor, the processor further performs steps which enable the processor to perform parsing, tracking and association of emitters.

15. The article according to claim 9, wherein in response to the instructions executed by the processor, the processor further performs steps which enable the processor to use human speech recognition/text processing to process the received pulses where a radar language comprises pulse sequences, which are analogous to speech phonemes, waveform sequences, which are analogous to words in human speech, and phrases, which are analogous to phrases in human speech, and states, which are analogous to a sentence in human speech.

16. The article according to claim 15, wherein in response to the instructions executed by the processor, the processor further performs steps which enable the processor to estimate a state/function of the unknown emitter from combinations of the received pulses.

17. A radar warning system, comprising:
a memory; and
a processor coupled to the memory, the processor and the memory configured to:
receive radar pulses from an unknown radar emitter;
process the received radar pulses using a weighted finite state machine implemented in the radar warning system to learn a model of the unknown radar emitter;
store the learned model in the memory;
estimate, using the processor, a state/function of the unknown radar emitter based on the received radar pulses using the stored learned model; and
automatically build finite state machines using-finite state transducers based on instructions stored in the memory.

18. The system according to claim 17, wherein the processor and the memory are further configured to determine weights for the weighted finite state machine using expectation-maximization processing.

* * * * *